(12) United States Patent
Kang

(10) Patent No.: US 11,171,564 B2
(45) Date of Patent: Nov. 9, 2021

(54) POWER PROVIDER AND DRIVING METHOD THEREOF

(71) Applicant: Samsung Display Co., Ltd., Yongin-si (KR)

(72) Inventor: Kwang Hun Kang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/008,826

(22) Filed: Sep. 1, 2020

(65) Prior Publication Data

US 2021/0281174 A1 Sep. 9, 2021

(30) Foreign Application Priority Data

Mar. 6, 2020 (KR) .................. 10-2020-0028594

(51) Int. Cl.
*H02M 3/158* (2006.01)
*H02M 1/36* (2007.01)
*H02M 1/32* (2007.01)
*G09G 3/20* (2006.01)

(52) U.S. Cl.
CPC ............ *H02M 3/158* (2013.01); *H02M 1/32* (2013.01); *H02M 1/36* (2013.01); *G09G 3/20* (2013.01); *G09G 2310/08* (2013.01); *G09G 2330/026* (2013.01); *G09G 2330/04* (2013.01)

(58) Field of Classification Search
None
See application file for complete search history.

(56) References Cited

U.S. PATENT DOCUMENTS

| 7,443,641 | B2 | 10/2008 | Suzuki |
| 8,174,802 | B2 | 5/2012 | Abe |
| 8,411,077 | B2 * | 4/2013 | Park ................. H02M 3/158 |
| | | | 345/212 |
| 8,791,935 | B2 * | 7/2014 | Park ................. H05B 45/60 |
| | | | 345/211 |
| 9,058,773 | B2 * | 6/2015 | Park .................. G09G 3/3233 |
| 9,614,448 | B2 | 4/2017 | Hayakawa et al. |
| 10,741,117 | B2 * | 8/2020 | Park .................... G09G 3/20 |

FOREIGN PATENT DOCUMENTS

| JP | 5928506 B2 | 6/2016 |
| KR | 10-1055340 B1 | 8/2011 |
| KR | 10-1211982 B1 | 12/2012 |

* cited by examiner

*Primary Examiner* — Jeffery S Zweizig
(74) *Attorney, Agent, or Firm* — Lewis Roca Rothgerber Christie LLP

(57) ABSTRACT

A power provider includes: a first power source configured to receive an input voltage and to provide a first power voltage to a first output terminal; a low voltage detection circuit configured to provide a low voltage detection signal of an enable level in response to the input voltage being less than a reference low voltage, and to provide the low voltage detection signal of a disable level in response to the input voltage being greater than the reference low voltage; a first soft start circuit configured to connect the first input terminal to the first output terminal in response to a first control signal for the first power source being changed from a disable level to an enable level; and a first boost converter configured to convert the input voltage to provide the first power voltage greater than the input voltage to the first output terminal.

20 Claims, 15 Drawing Sheets

<High Driving Frequency>

<Low Driving Frequency>

POWER PROVIDER AND DRIVING METHOD THEREOF

CROSS-REFERENCE TO RELATED APPLICATION

The present application claims priority to and the benefit of Korean Patent Application No. 10-2020-0028594, filed Mar. 6, 2020, which is hereby incorporated by reference for all purposes as if fully set forth herein.

BACKGROUND

1. Field

Aspects of some example embodiments of the present invention relate to a power provider and a driving method thereof.

2. Discussion

With the development of information technology, display devices, which provide a connection medium between users and information, grown in importance. In response to this, the use of display devices such as liquid crystal display devices, organic light emitting display devices, plasma display devices, and the like has increased.

A display device generally displays images through a combination of light emitted from a plurality of pixels. The display device may include a power provider for providing a power voltage to be supplied to the plurality of pixels.

The power provider may generate the power voltage when the display device is powered-on or when an under voltage lock out (UVLO) operation is released. For each of the above cases, the power provider needs to efficiently generate the power voltage.

The above information disclosed in this Background section is only for enhancement of understanding of the background and therefore the information discussed in this Background section does not necessarily constitute prior art.

SUMMARY

Aspects of some example embodiments include a power provider and a driving method thereof that can be efficiently operated when power-on or an UVLO operation is released.

A power provider according to some example embodiments of the present invention may include: a first power source receiving an input voltage from a first input terminal and providing a first power voltage to a first output terminal; and a low voltage detection circuit providing a low voltage detection signal of an enable level when the input voltage is less than a reference low voltage, and providing the low voltage detection signal of a disable level when the input voltage is greater than the reference low voltage. The first power source may include: a first soft start circuit connecting the first input terminal to the first output terminal during a first period when a first control signal for the first power source is changed from a disable level to an enable level; and a first boost converter converting the input voltage to provide the first power voltage greater than the input voltage to the first output terminal after the first period. The first boost converter may stop the conversion of the input voltage when the low voltage detection signal is changed from the disable level to the enable level, and the first soft start circuit may connect the first input terminal to the first output terminal during a second period when the low voltage detection signal is changed from the enable level to the disable level.

According to some example embodiments, the first boost converter may convert the input voltage to provide the first power voltage greater than the input voltage to the first output terminal after the second period.

According to some example embodiments, the power provider may further include: a second power source converting the input voltage received by a second input terminal to provide a second power voltage less than the input voltage to a second output terminal during a third period between the first period and the second period; and a short-circuit detection circuit stopping an operation of the second power source when a voltage of the second output terminal is greater than a reference short-circuit voltage during a fourth period between the first period and the third period.

According to some example embodiments, the second power source may convert the input voltage to provide the second power voltage less than the input voltage to the second output terminal during at least a portion of the second period.

According to some example embodiments, the power provider may further include a register including information on a voltage level of the second power voltage, and the second power source may determine the voltage level of the second power voltage referring to the information provided from the register when the low voltage detection signal is changed from the enable level to the disable level.

According to some example embodiments, the first soft start circuit may include a first switch having a first electrode connected to the first input terminal and a second electrode connected to the first output terminal.

According to some example embodiments, the first boost converter may include: a first inductor having one end connected to the first input terminal and the other end connected to a first node; a second switch having a first electrode connected to the first node and a second electrode connected to a ground power source; and a third switch having a first electrode connected to the first node and a second electrode connected to the first output terminal.

According to some example embodiments, the second power source may include: a fourth switch having a first electrode connected to the second input terminal and a second electrode connected to a second node; a second inductor having one end connected to the second node and the other end connected to the ground power source; and a fifth switch having a first electrode connected to the second node and a second electrode connected to the second output terminal.

According to some example embodiments, the power provider may further include a third power source receiving the input voltage from a third input terminal and providing a third power voltage to a third output terminal, and the third power source may include: a second soft start circuit connecting the third input terminal to the third output terminal during a fifth period when a second control signal for the third power source is changed from a disable level to an enable level; and a second boost converter converting the input voltage to provide the third power voltage greater than the input voltage to the third output terminal after the fifth period. The third power voltage may be greater than the first power voltage during the third period.

According to some example embodiments, the second boost converter may stop the conversion of the input voltage when the low voltage detection signal is changed from the disable level to the enable level, and the second soft start circuit may connect the third input terminal to the third output terminal during a sixth period when the low voltage detection signal is changed from the enable level to the disable level.

According to some example embodiments, the second soft start circuit may include a sixth switch having a first electrode connected to the third input terminal and a second electrode connected to the third output terminal.

According to some example embodiments, the second boost converter may include: a third inductor having one end connected to the third input terminal and the other end connected to a third node; a seventh switch having a first electrode connected to the third node and a second electrode connected to the ground power source; and an eighth switch having a first electrode connected to the third node and a second electrode connected to the third output terminal.

A power provider according to some example embodiments of the present invention may include: a first power source converting an input voltage received from a first input terminal to provide a first power voltage greater than the input voltage to a first output terminal; a second power source converting the input voltage received from a second input terminal to provide a second power voltage less than the input voltage to a second output terminal; and a low voltage detection circuit providing a low voltage detection signal of an enable level when the input voltage is less than a reference low voltage, and providing the low voltage detection signal of a disable level when the input voltage is greater than the reference low voltage. The first power source and the second power source may stop the conversion of the input voltage when the low voltage detection signal is changed from the disable level to the enable level, the first power source may increase a level of the first power voltage during a first period when the low voltage detection signal is changed from the enable level to the disable level, and the second power source may decrease a level of the second power voltage during at least a portion of the first period.

According to some example embodiments, the power provider may further include a register including information on a voltage level of the second power voltage, and the second power source may determine the voltage level of the second power voltage referring to the information provided from the register when the low voltage detection signal is changed from the enable level to the disable level.

According to some example embodiments, the power provider may further include a third power source converting the input voltage received from a third input terminal to provide a third power voltage greater than the input voltage to a third output terminal. The third power source may stop the conversion of the input voltage when the low voltage detection signal is changed from the disable level to the enable level, the third power source may increase a level of the third power voltage during a second period when the low voltage detection signal is changed from the enable level to the disable level, and the level of the third power voltage after the first period and the second period has elapsed may be greater than the level of the first power voltage.

In a driving method of a power provider according to some example embodiments of the present invention, the power provider may include: a first power source receiving an input voltage from a first input terminal and providing a first power voltage to a first output terminal; and a low voltage detection circuit providing a low voltage detection signal of an enable level when the input voltage is less than a reference low voltage, and providing the low voltage detection signal of a disable level when the input voltage is greater than the reference low voltage, and the driving method may include: connecting the first input terminal to the first output terminal during a first period when a first control signal for the first power source is changed from a disable level to an enable level; converting the input voltage to provide the first power voltage greater than the input voltage to the first output terminal after the first period; stopping the conversion of the input voltage by the first power source when the low voltage detection signal is changed from the disable level to the enable level; and connecting the first input terminal to the first output terminal during a second period when the low voltage detection signal is changed from the enable level to the disable level.

According to some example embodiments, the driving method may further include: converting the input voltage by the first power source to provide the first power voltage greater than the input voltage to the first output terminal after the second period.

According to some example embodiments, the power provider may further include a second power source receiving the input voltage from a second input terminal and providing a second power voltage to a second output terminal, and the driving method may further include: converting the input voltage received from the second input terminal by the second power source to provide the second power voltage less than the input voltage to the second output terminal during a third period between the first period and the second period; and stopping an operation of the second power source when a voltage of the second output terminal is greater than a reference short-circuit voltage during a fourth period between the first period and the third period.

According to some example embodiments, the driving method may further include: converting the input voltage by the second power source to provide the second power voltage less than the input voltage to the second output terminal during at least a portion of the second period.

According to some example embodiments, the power provider may further include a register including information on a voltage level of the second power voltage, and the driving method may further includes: determining the voltage level of the second power voltage by the second power source referring to the information provided from the register when the low voltage detection signal is changed from the enable level to the disable level.

BRIEF DESCRIPTION OF THE DRAWINGS

The accompanying drawings, which are included to provide a further understanding of the inventive concepts, and are incorporated in and constitute a part of this specification, illustrate aspects of some example embodiments of the inventive concepts, and, together with the description, serve to explain principles of the inventive concepts.

DETAILED DESCRIPTION

Figure 1:
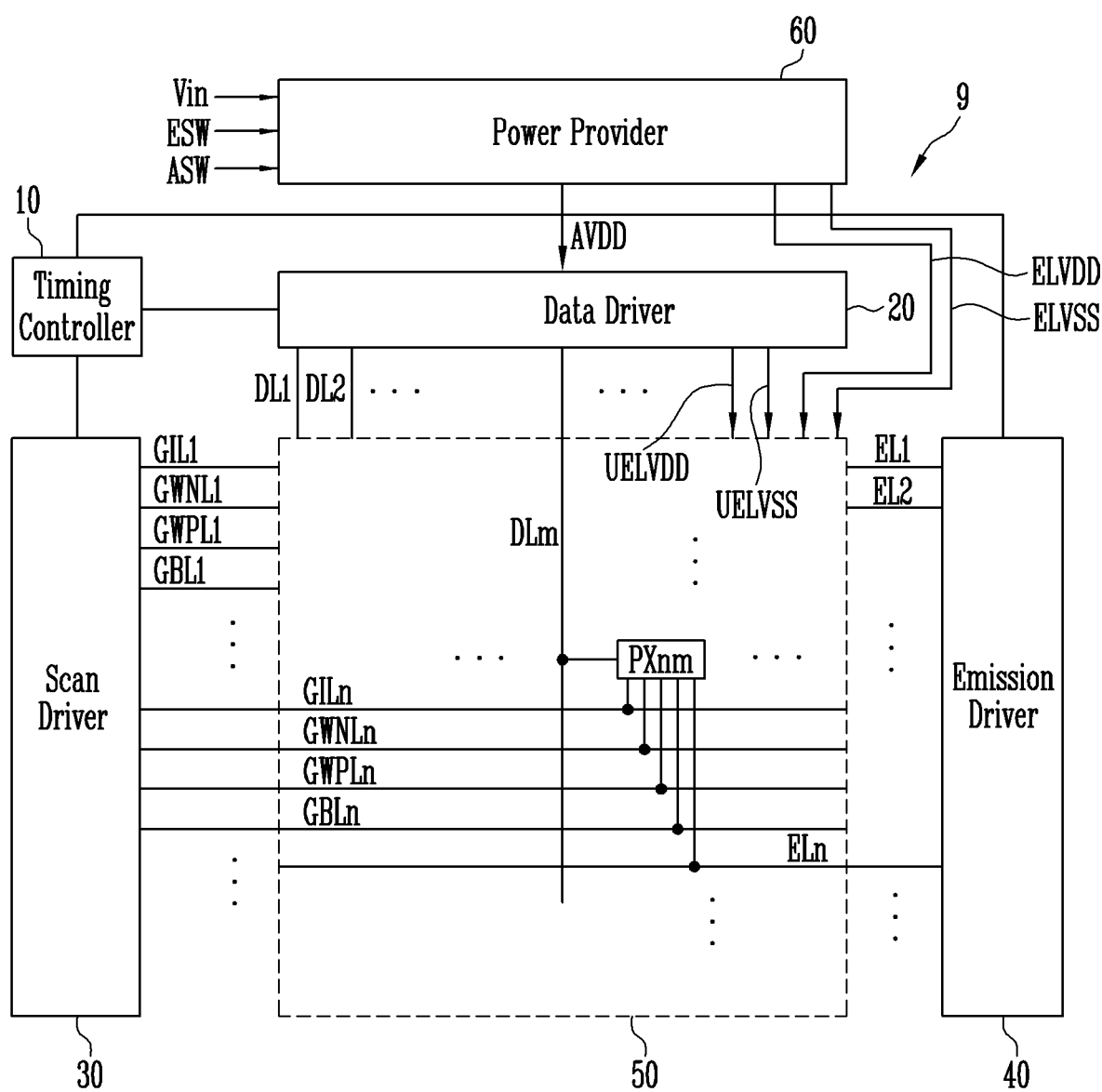
FIG. 1 is a block diagram for explaining a display device according to some example embodiments of the present invention.

Hereinafter, aspects of some example embodiments of the present invention will be described in more detail with reference to the accompanying drawings so that those skilled in the art can more easily implement the present invention. The present invention may be embodied in various different forms and is not limited to the embodiments described herein.

In order to clearly illustrate aspects of some example embodiments of the present invention, parts that are not necessary to enable a person having ordinary skill in the art to understand the description of the invention may be omitted, and the same or similar components are denoted by the same reference numerals throughout the specification. Therefore, the above-mentioned reference numerals can be used in other drawings.

In addition, the size and thickness of each component shown in the drawings are arbitrarily shown for convenience of description, and thus the present invention is not necessarily limited to those shown in the drawings. In the drawings, thicknesses may be exaggerated for clarity of presentation of layers and regions.

Hereinafter, an expression that an electrode or line is connected to another electrode or line may indicate not only a case in which the electrode or line is "directly" connected to another electrode or line, but also a case in which the electrode or line is "indirectly" connected to another electrode or line through other component.

FIG. 1 is a block diagram for explaining a display device according to some example embodiments of the present invention.

Referring to FIG. 1, a display device 9 according to some example embodiments may include a timing controller 10, a data driver 20, a scan driver 30, an emission driver 40, a pixel unit 50, and a power provider 60.

The timing controller 10 may receive an external input signal from an external processor. The external input signal may include a horizontal synchronization signal Hsync, a vertical synchronization signal Vsync, a data enable signal, RGB data signals, and the like.

The vertical synchronization signal may include a plurality of pulses. The end of a previous frame period and the start of a current frame period may be indicated based on a time point at which each pulse is generated. An interval between adjacent pulses of the vertical synchronization signal may be correspond to one frame period. The horizontal synchronization signal may include a plurality of pulses. The end of a previous horizontal period and the start of a new horizontal period may be indicated based on a time point at which each pulse is generated. An interval between adjacent pulses of the horizontal synchronization signal may be correspond to one horizontal period. The data enable signal may have an enable level in certain horizontal periods and a disable level in the remaining periods. When the data enable signal is at the enable level, the RGB data signals may be supplied in corresponding horizontal periods. The RGB data signals may be supplied in units of pixel rows in each of the corresponding horizontal periods. The timing controller 10 may generate grayscale values based on the RGB data signals to correspond to the specifications of the display device 9. The timing controller 10 may generate control signals to be supplied to the data driver 20, the scan driver 30, and the emission driver 40 based on the external input signal to correspond to the specifications of the display device 9.

The power provider 60 may receive an input voltage Vin from a battery or the like, and convert the input voltage Vin to provide a first power voltage ELVDD, a second power voltage ELVSS, and a third power voltage AVDD. The power provider 60 may receive a first control signal ESW and provide the first power voltage ELVDD and the second power voltage ELVSS based on the first control signal ESW. The power provider 60 may receive a second control signal ASW and provide the third power voltage AVDD based on the second control signal ASW. The power provider 60 may receive the first control signal ESW and the second control signal ASW from at least one of the timing controller 10, the data driver 20, and the external processor. For example, the power provider 60 may be configured with a power management integrated chip (PMIC). For example, the power provider 60 may be configured as an external DC/DC IC.

The data driver 20 may generate data voltages to be provided to data lines DL1, DL2, and DLm using the grayscale values and the control signals received from the timing controller 10. For example, the data driver 20 may sample the grayscale values using a clock signal, and supply the data voltages corresponding to the grayscale values to the data lines DL1, DL2, and DLm in units of pixel rows (for example, pixels connected to the same scan line).

The data driver 20 may receive the third power voltage AVDD from the power provider 60, and generate at least one of a fourth power voltage UELVDD and a fifth power voltage UELVSS using the third power voltage AVDD in some cases. For example, the data driver 20 may include a low dropout circuit, and generate at least one of the fourth power voltage UELVDD and the fifth power voltage UELVSS by dropping the third power voltage AVDD.

For example, the data driver 20 may generate at least one of the fourth power voltage UELVDD and the fifth power voltage UELVSS in a second display mode (low frequency driving, refer to FIG. 6) which will be described later. In this case, the power provider 60 may not provide the first power voltage ELVDD and the second power voltage ELVSS. In this case, the fourth power voltage UELVDD may be applied to a first power line ELVDDL, and the fifth power voltage UELVSS may be applied to a second power line ELVSSL (refer to FIG. 2). Thus, power consumption can be reduced in the second display mode. For example, the data driver 20 may not generate the fourth power voltage UELVDD and the fifth power voltage UELVSS in a first display mode (high frequency driving, refer to FIG. 3) which will be described later. In this case, the power provider 60 may provide the first power voltage ELVDD and the second power voltage ELVSS. In this case, the first power voltage ELVDD may be applied to the first power line ELVDDL, and the second power voltage ELVSS may be applied to the second power line ELVSSL (refer to FIG. 2). That is, the power consumption can be optimized by the data driver 20 and the power provider 60 providing power voltages complementarily according to display modes.

The scan driver 30 may receive a clock signal, a scan start signal, and the like from the timing controller 10 to generate scan signals to be provided to scan lines GIL1, GWNL1, GWPL1, GBL1, GILn, GWNLn, GWPLn, and GBLn, where n may be an integer greater than 0.

The scan driver 30 may include a plurality of sub-scan drivers. For example, a first sub-scan driver may provide scan signals for the scan lines GIL1 to GILn, a second sub-scan driver may provide scan signals for the scan lines GWNL1 to GWNLn, a third sub-scan driver may provide scan signals for the scan lines GWPL1 to GWPLn, and a fourth sub-scan driver may provide scan signals for the scan lines GBL1 to GBLn. Each of the sub-scan drivers may include a plurality of scan stages connected in the form of a shift register. For example, the scan signals may be generated by sequentially transmitting a pulse of a turn-on level of the scan start signal supplied to a scan start line to the next scan stage.

For another example, the first and second sub-scan drivers may be integrated to provide the scan signals for the scan lines GIL1 to GILn and GWNL1 to GWNLn, and the third and fourth sub-scan drivers may be integrated to provide the scan signals for the scan lines GWPL1 to GWPLn and GBL1 to GBLn. For example, a previous scan line (that is, an (n−1)th scan line) of an n-th scan line GWNLn may be connected to the same electrical node as an n-th scan line GILn. Also, for example, the next scan line (that is, an (n+1)th scan line) of an n-th scan line GWPLn may be connected to the same electrical node as an n-th scan line GBLn.

In this case, the first and second sub-scan drivers may supply the scan signals having pulses of a first polarity to the scan lines GIL1 to GILn and GWNL1 to GWNLn. Also, the third and fourth sub-scan drivers may supply the scan signals having pulses of a second polarity to the scan lines GWPL1 to GWPLn and GBL1 to GBLn. The first polarity and the second polarity may be opposite polarities.

Hereinafter, a polarity may mean a logic level of a pulse. For example, when the pulse is of the first polarity, the pulse may have a high level. At this time, the high level pulse may be referred to as a rising pulse. When the rising pulse is supplied to a gate electrode of an N-type transistor, the N-type transistor may be turned on. That is, the rising pulse may be a turn-on level for the N-type transistor. Here, it is assumed that a voltage at a level sufficiently low in comparison with a voltage of the gate electrode is applied to a source electrode of the N-type transistor. For example, the N-type transistor may be an NMOS transistor.

Also, when the pulse is of the second polarity, the pulse may have a low level. At this time, the low level pulse may be referred to as a falling pulse. When the falling pulse is supplied to a gate electrode of a P-type transistor, the P-type transistor may be turned on. That is, the falling pulse may be a turn-on level for the P-type transistor. Here, it is assumed that a voltage at a level sufficiently high in comparison with a voltage of the gate electrode is applied to a source electrode of the P-type transistor. For example, the P-type transistor may be a PMOS transistor.

The emission driver 40 may receive a clock signal, an emission stop signal, and the like from the timing controller 10 to generate emission signals to be provided to emission lines EL1, EL2, and Eln. For example, the emission driver 40 may sequentially provide the emission signals having a pulse of a turn-off level to the emission lines EL1, EL2, and Eln. For example, the emission driver 40 may be configured in the form of a shift register, and generate the emission signals by sequentially transmitting a pulse of a turn-off level of the emission stop signal to the next emission stage under the control of the clock signal.

The pixel unit 50 may include pixels. For example, a pixel PXnm may be connected to corresponding data line DLm, scan lines GILn, GWNLn, GWPLn, and GBLn, and emission line Eln.

Figure 2:
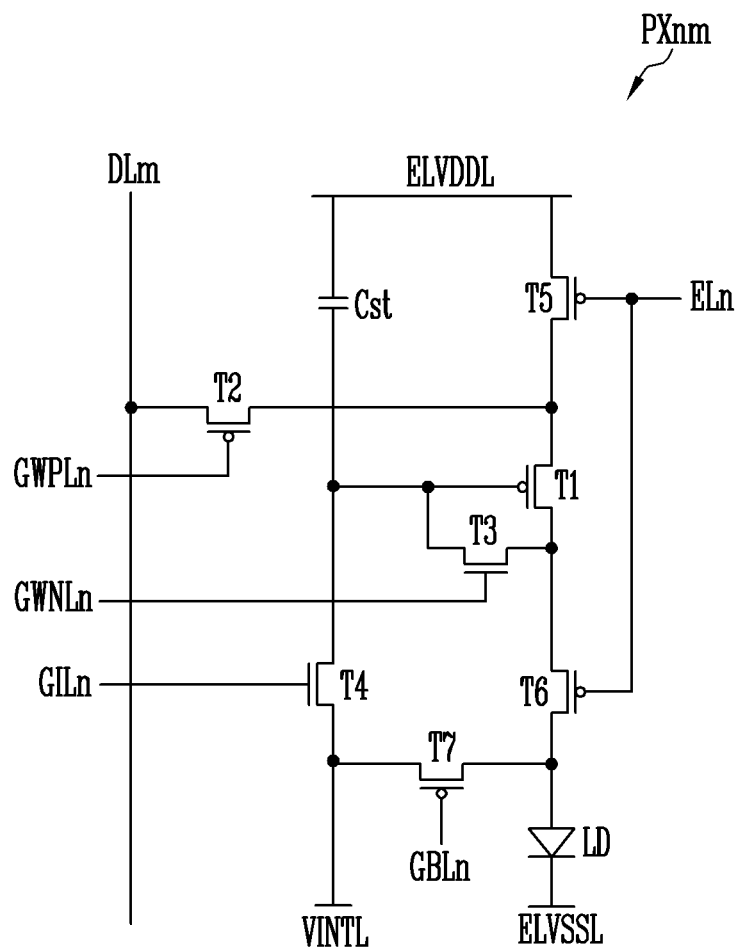
FIG. 2 is a circuit diagram for explaining a pixel according to some example embodiments of the present invention.

FIG. 2 is a circuit diagram for explaining a pixel according to some example embodiments of the present invention.

Referring to FIG. 2, the pixel PXnm according to some example embodiments of the present invention may include transistors T1, T2, T3, T4, T5, T6, and T7, a storage capacitor Cst, and a light emitting diode LD.

The transistor T1 may include a first electrode connected to a first electrode of the transistor T2, a second electrode connected to a first electrode of the transistor T3, and a gate electrode connected to a second electrode of the transistor T3. The transistor T1 may be referred to as a driving transistor.

The transistor T2 may include the first electrode connected to the first electrode of the transistor T1, a second electrode connected to a data line DLm, and a gate electrode connected to a scan line GWPLn. The transistor T2 may be referred to as a scan transistor.

The transistor T3 may include the first electrode connected to the second electrode of the transistor T1, the second electrode connected to the gate electrode of the transistor T1, and a gate electrode connected to a scan line GWNLn. The transistor T3 may be referred to as a diode connected transistor.

The transistor T4 may include a first electrode connected to a second electrode of the storage capacitor Cst, a second electrode connected to an initialization line VINTL, and a gate electrode connected to a scan line GILn. Transistor T4 may be referred to as a gate initialization transistor.

The transistor T5 may include a first electrode connected to the first power line ELVDDL, a second electrode connected to the first electrode of the transistor T1, and a gate electrode connected to an emission line ELn. The transistor T5 may be referred to as a first emission transistor.

The transistor T6 may include a first electrode connected to the second electrode of the transistor T1, a second electrode connected to an anode of the light emitting diode LD, and a gate electrode connected to the emission line ELn. The transistor T6 may be referred to as a second emission transistor.

The transistor T7 may include a first electrode connected to the anode of the light emitting diode LD, a second electrode connected to the initialization line VINTL, and a gate electrode connected to a scan line GBLn. Transistor T7 may be referred to as an anode initialization transistor.

The storage capacitor Cst may include the first electrode connected to the first power line ELVDDL, and the second electrode connected to the gate electrode of the transistor T1.

The light emitting diode LD may include the anode connected to the second electrode of the transistor T6, and a cathode connected to the second power line ELVSSL. A voltage applied to the second power line ELVSSL may be set lower than a voltage applied to the first power line ELVDDL. The light emitting diode LD may be an organic light emitting diode, an inorganic light emitting diode, a quantum dot light emitting diode, or the like.

The transistors T1, T2, T5, T6, and T7 may be P-type transistors. Channels of the transistors T1, T2, T5, T6, and T7 may be made of polysilicon. The polysilicon transistor may be a low temperature poly silicon (LTPS) transistor. The polysilicon transistor has high electron mobility, and thus has fast driving characteristics.

The transistors T3 and T4 may be N-type transistors. Channels of the transistors T3 and T4 may be composed of an oxide semiconductor. The oxide semiconductor transistor can be manufactured in a low temperature process and has low charge mobility compared to the polysilicon transistor. Therefore, the amount of leakage current generated in a turn-off state of the oxide semiconductor transistor may be less than that of the polysilicon transistor.

According to some example embodiments, the transistor T7 may be composed of an N-type oxide semiconductor transistor rather than the polysilicon transistor. At this time, one of the scan lines GWNLn and GILn may be connected to the gate electrode of the transistor T7 instead of the scan line GBLn.

Figure 3:
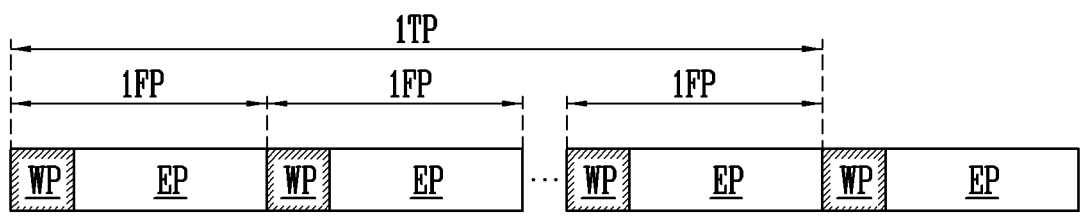
FIG. 3 is a diagram for explaining a high frequency driving method according to some example embodiments of the present invention.

FIG. 3 is a diagram for explaining a high frequency driving method according to some example embodiments of the present invention.

When the pixel unit 50 displays frames at a first driving frequency, the display device 9 may be expressed as being in the first display mode. Also, when the pixel unit 50 displays the frames at a second driving frequency lower than the first driving frequency, the display device 9 may be expressed as being in the second display mode.

In the first display mode, the display device 9 may display image frames at 20 Hz or more, for example, 60 Hz.

The second display mode may be a low power display mode. The display device 9 may display the image frames at less than 20 Hz, for example, 1 Hz. For example, a case where only the time and date are displayed in an "always on mode" among commercial modes may correspond to the second display mode.

A period 1TP may include a plurality of frame periods 1FP. The period 1TP may be a period defined arbitrarily for comparing the first display mode and the second display mode. The period 1TP may mean the same time interval in the first display mode and the second display mode. For convenience of description, it is assumed that a frame period 1FP has the same time interval in the first display mode and the second display mode. Therefore, the period 1TP may include the same number of frame periods 1FP in the first display mode and the second display mode.

In the first display mode, each of the frame periods 1FP may include a data writing period WP and a light emitting period EP. In FIG. 3, for convenience of description, based on a first pixel row, the data writing period WP is located at the beginning of the frame period 1FP, and the light emitting period EP is located after the data writing period WP. However, in a case of other pixel rows, the data writing period WP may be located in the middle or end of the frame period 1FP.

Accordingly, the pixel PXnm may display a plurality of image frames corresponding to the number of frame periods 1FP during the period 1TP based on the data voltages received in data writing periods WP.

Figure 4:
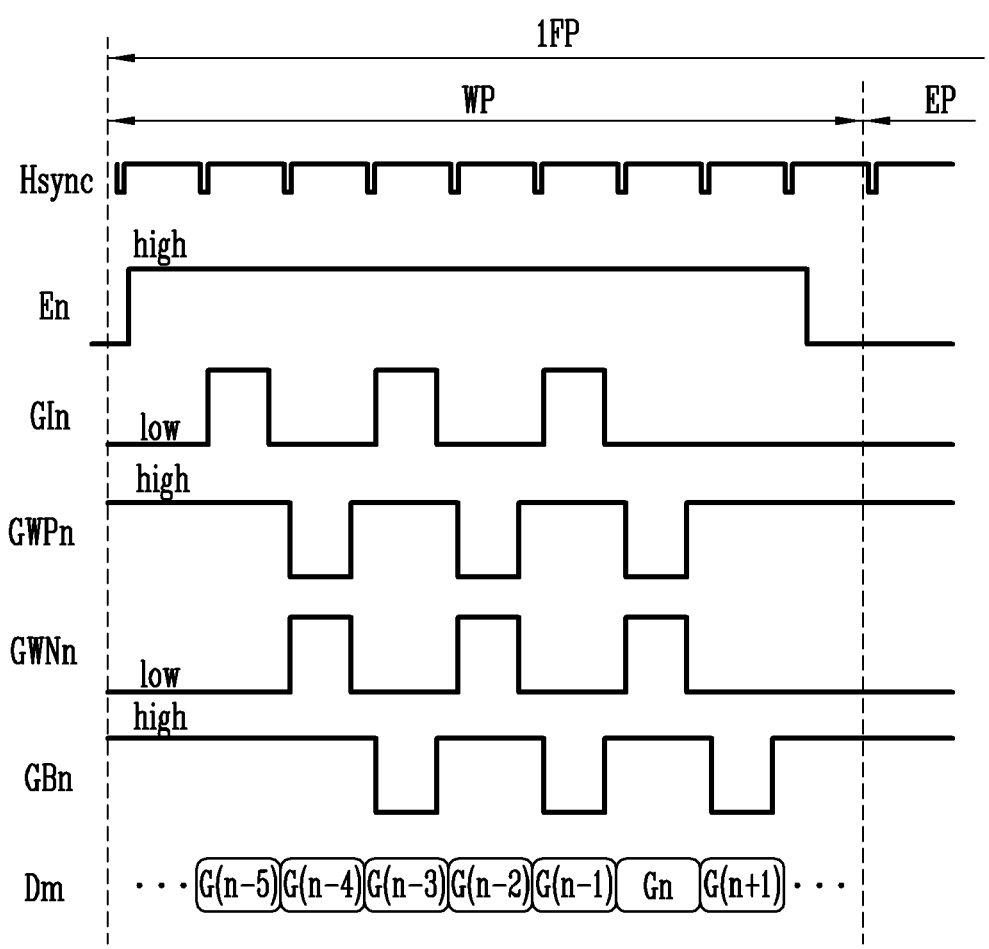
FIG. 4 is a timing diagram for explaining a data writing period according to some example embodiments of the present invention.
Figure 5:
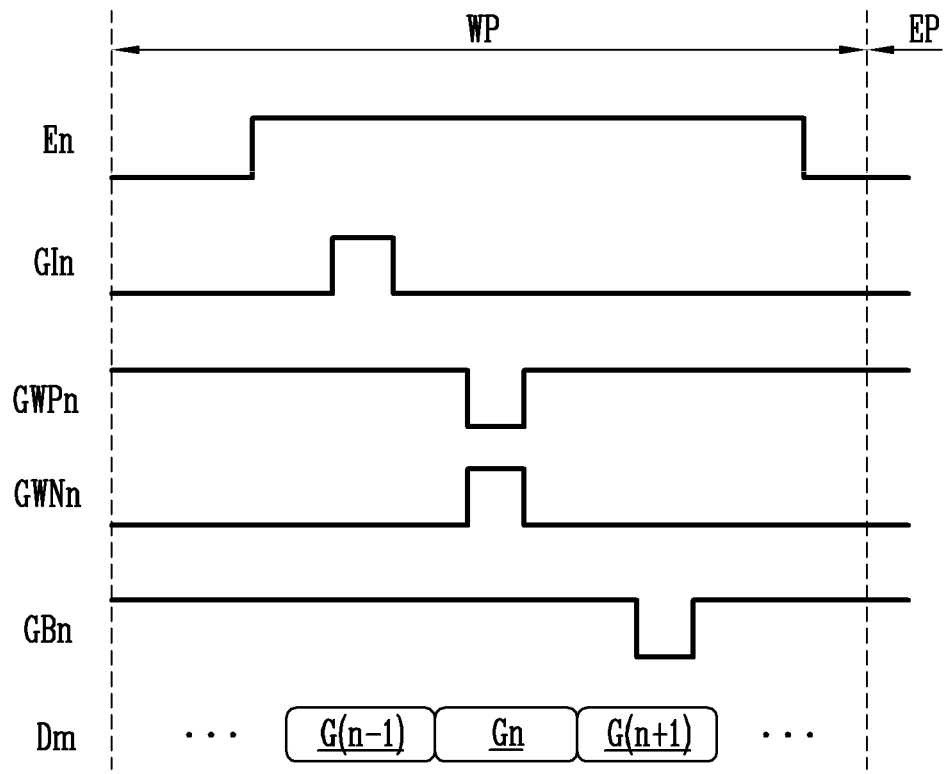
FIG. 5 is a timing diagram for explaining a data writing period according to some example embodiments of the present invention.

FIG. 4 is a timing diagram for explaining a data writing period according to some example embodiments of the present invention. FIG. 5 is another timing diagram for explaining a data writing period according to some example embodiments of the present invention.

First, an emission signal En of a turn-off level (high level) may be supplied to the emission line ELn during the data writing period WP. Therefore, the transistors T5 and T6 may be turned off during the data writing period WP.

First, a first pulse of a turn-on level (high level) may be supplied to a scan line Gln. Accordingly, the transistor T4 may be turned on, and the gate electrode of the transistor T1 and the initialization line VINTL may be connected to each other. Accordingly, a voltage of the gate electrode of the transistor T1 may be initialized to an initialization voltage of the initialization line VINTL, and may be maintained by the storage capacitor Cst. For example, the initialization voltage of the initialization line VINTL may be a voltage sufficiently lower than a voltage of the first power line ELVDDL. For example, the initialization voltage may be a voltage having the same or similar level to a voltage of the second power line ELVSSL. Therefore, the transistor T1 may be turned on.

Next, first pulses of the turn-on level may be supplied to scan lines GWPn and GWNn, and the corresponding transistors T2 and T3 may be turned on. Accordingly, a data voltage Dm applied to the data line DLm may be written to the storage capacitor Cst through the transistors T2, T1, and T3. However, the data voltage Dm at this time may correspond to a grayscale value G(n−4) of the pixel before 4 horizontal cycles. The data voltage Dm is not for emitting light of the pixel PXnm, but is for applying an on-bias voltage to the transistor T1. When the on-bias voltage is applied to the transistor T1 before the desired data voltage Dm is written, hysteresis phenomenon can be improved.

Next, the first pulse of the turn-on level (low level) may be supplied to a scan line GBn, and the transistor T7 may be turned on. Therefore, a voltage of the anode of the light emitting diode LD may be initialized.

At this time, a second pulse of the turn-on level (high level) may be supplied to the scan line GILn, and the above-described driving process may be performed again. That is, once again the on-bias voltage may be applied to the transistor T1, and the voltage of the anode of the light emitting diode LD may be initialized.

By repeating the above-described process, when third pulses of the turn-on level are supplied to the scan lines GWPLn and GWNLn, the data voltage Dm corresponding to a grayscale value Gn of the pixel PXnm may be stored in the storage capacitor Cst. At this time, the data voltage Dm written to the storage capacitor Cst may be a voltage reflecting decrease in a threshold voltage of the transistor T1.

Finally, when the emission signal En becomes the turn-on level (low level), the transistors T5 and T6 may be turned on.

Accordingly, a driving current path connected through the first power line ELVDDL, the transistors T5, T1, and T6, the light emitting diode LD, and the second power line ELVSSL may be formed, and a driving current may flow. The amount of driving current may correspond to the data voltage Dm stored in the storage capacitor Cst. At this time, because the driving current flows through the transistor T1, the decrease in the threshold voltage of the transistor T1 may be reflected. Accordingly, the decrease in the threshold voltage reflected in the data voltage Dm stored in the storage capacitor Cst and the decrease in the threshold voltage reflected in the driving current may cancel each other. Therefore, the driving current corresponding to the data voltage Dm may flow regardless of a threshold voltage value of the transistor T1.

The light emitting diode LD may emit light at a desired luminance according to the amount of driving current.

According to some example embodiments, each of the scan signals is described as including three pulses, but according to some example embodiments, each of the scan signals may include two pulses or four or more pulses. According to some example embodiments, each of the scan signals may be configured to include one pulse. In this case, the process of applying the on-bias voltage to the transistor T1 may be omitted (refer to FIG. 5).

In addition, the interval between adjacent pulses of the horizontal synchronization signal Hsync may correspond to one horizontal period. In FIG. 4, the pulse of the horizontal synchronization signal Hsync is shown at the low level. However, according to some example embodiments, the pulse of the horizontal synchronization signal Hsync may be at the high level.

Figure 6:
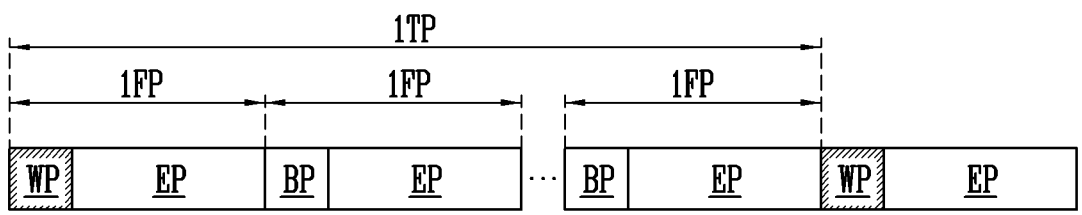
FIG. 6 is a diagram for explaining a low frequency driving method according to some example embodiments of the present invention.

FIG. 6 is a diagram for explaining a low frequency driving method according to some example embodiments of the present invention.

In the second display mode, a first frame period 1FP of the period 1TP may include the data writing period WP and the light emitting period EP, and the remaining frame periods 1FP of the period 1TP may include a bias refresh period BP and the light emitting period EP.

The transistors T3 and T4 of the pixel PXnm may maintain the turn-off state during the remaining frame periods 1FP of the period 1TP. Therefore, the storage capacitor Cst may maintain the same data voltage during the plurality of image frames. For example, because the transistors T3 and T4 may be composed of oxide semiconductor transistors, leakage current can be minimized.

Therefore, the pixel PXnm may display the same single image frame during the period 1TP based on the data voltage supplied in the data writing period WP.

Figure 7:
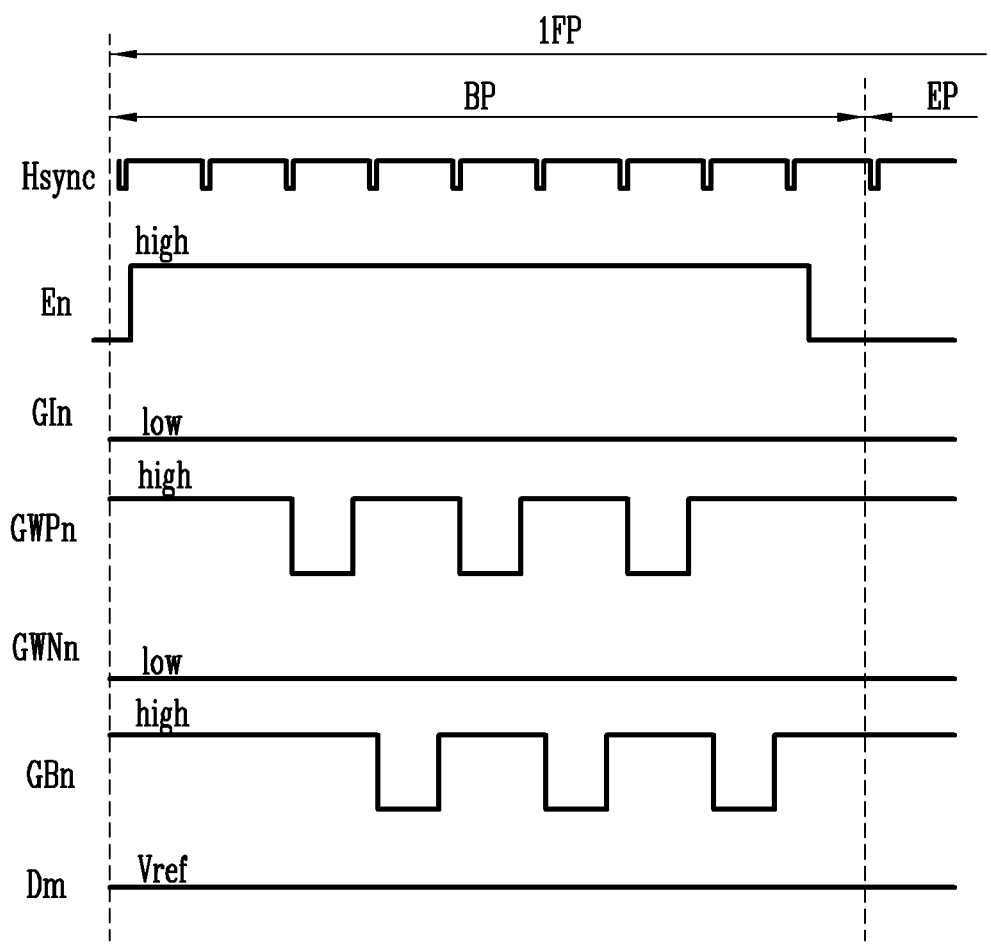
FIG. 7 is a timing diagram for explaining a bias refresh period according to some example embodiments of the present invention.
Figure 8:
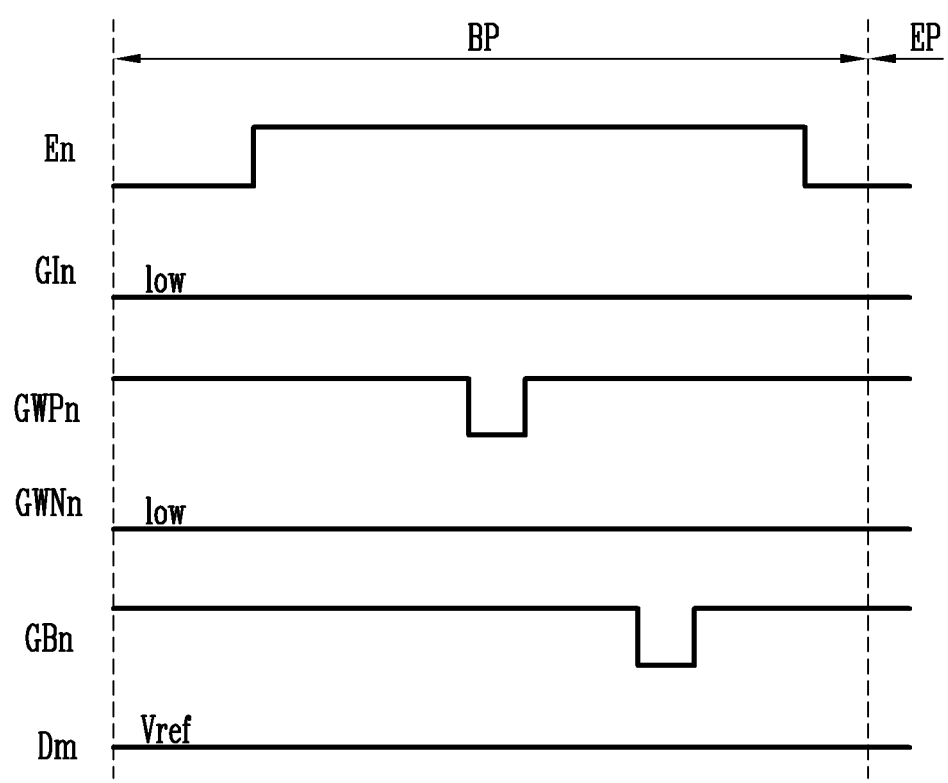
FIG. 8 is another timing diagram for explaining a bias refresh period according to some example embodiments of the present invention.

FIG. 7 is a timing diagram for explaining a bias refresh period according to some example embodiments of the present invention. FIG. 8 is another timing diagram for explaining a bias refresh period according to some example embodiments of the present invention.

Referring to FIG. 7, in the bias refresh period BP, the scan signals Gln and GWNn of the turn-off level (low level) may be supplied. Therefore, as described above, the data voltage written to the storage capacitor Cst in the bias refresh period BP may not be changed. At this time, a reference data voltage Vref may be applied to the data line DLm.

However, in the bias refresh period BP, the emission signal En and the scan signals GWPn and GBn having the same waveform as the data writing period WP may be supplied. Accordingly, in the plurality of frame periods 1FP of the period 1TP, as the waveform of light emitted from the light emitting diode LD becomes similar, flicker may not be recognized by a user when driving at a low frequency.

The pixel PXnm described with reference to FIGS. 1 to 7 is one example of a pixel suitable for the high frequency driving and the low frequency driving. Aspects of some example embodiments to be described later may also be applied to pixels having other circuits capable of the high frequency driving and the low frequency driving. For example, the transistors T1 to T7 of the pixel PXnm may all be composed of only P-type transistors. In this case, because the scan driver 30 only needs to include a sub-scan driver for the P-type transistors, the configuration of the scan driver 30 can be simplified. For example, the transistors of the pixel PXnm may not include the emission transistors T5 and T6. In this case, the emission driver 40 may be unnecessary.

According to some example embodiments, a case where each of the scan signals GWPn and GBn includes three pulses has been described. However, according to some example embodiments, each of the scan signals GWPn and GBn may include two pulses or four or more pulses. According to some example embodiments, each of the scan signals GWPn and GBn may be configured to include one pulse. In this case, the process of applying the on-bias voltage to the transistor T1 may be omitted (refer to FIG. 8).

The period 1TP in which the pixel unit 50 is driven in the first display mode may be referred to as a first period (refer to FIG. 3). The period 1TP in which the pixel unit 50 is driven in the second display mode may be referred to as a second period (refer to FIG. 6). In this case, time intervals of the first period and the second period may be the same. That is, the first period and the second period may include the same number of frame periods 1FP.

The plurality of scan stages may supply the scan signals of the turn-on level during the first period in a first cycle. For example, referring to FIGS. 3 and 5, the scan signals of the turn-on level may be supplied in proportion to the number of data writing periods WP in the first period. The plurality of scan stages may supply the scan signals of the turn-on level during the second period in a second cycle. For example, referring to FIGS. 6 and 8, the scan signals of the turn-on level may be supplied in proportion to the number of data writing periods WP in the second period. The number of data writing periods WP included in the second period may be less than the number of data writing periods WP included in the first period. Therefore, the first period may be shorter than the second period.

Figure 9:
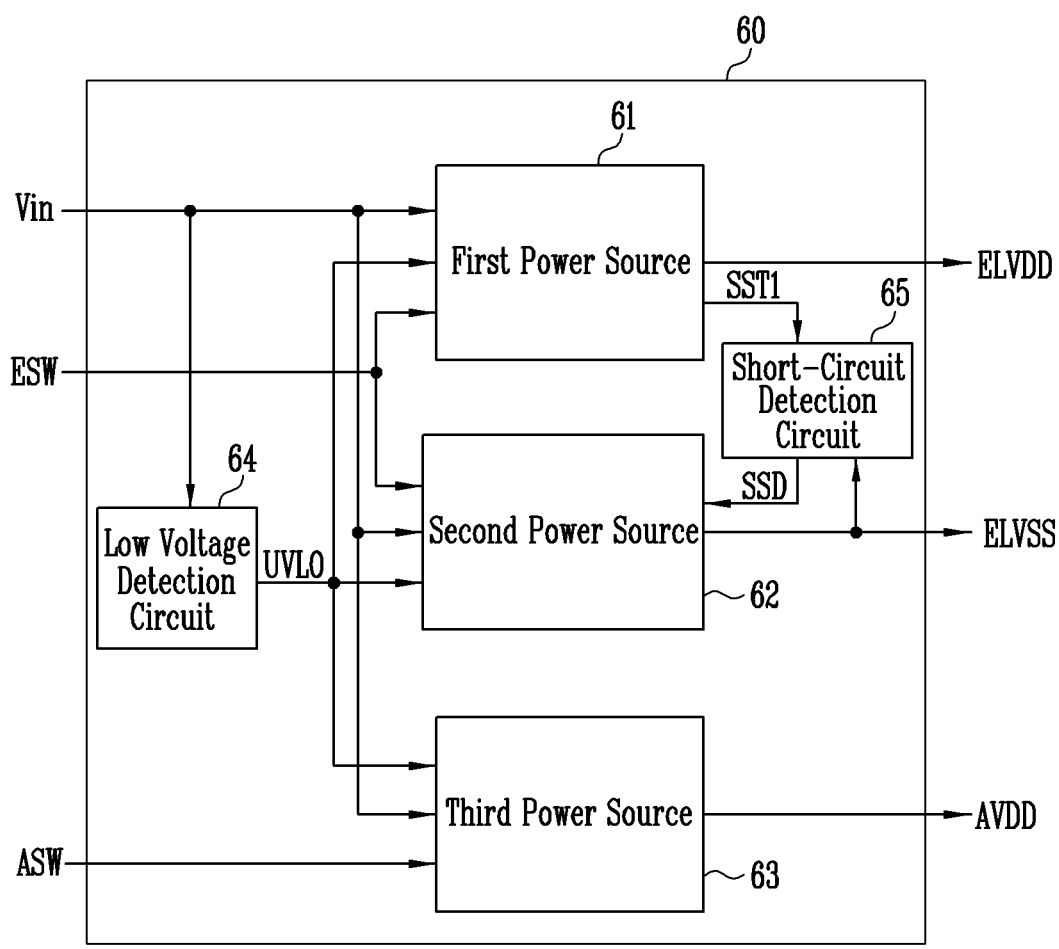
FIG. 9 is a block diagram for explaining a power provider according to some example embodiments of the present invention.

FIG. 9 is a block diagram for explaining a power provider according to some example embodiments of the present invention.

Referring to FIG. 9, the power provider 60 according to some example embodiments of the present invention may include a first power source 61, a second power source 62, a third power source 63, a low voltage detection circuit 64, and a short-circuit detection circuit 65.

The low voltage detection circuit 64 may provide a low voltage detection signal UVLO of an enable level when the input voltage Vin is less than a reference low voltage, and provide the low voltage detection signal UVLO of a disable level when the input voltage Vin is greater than the reference low voltage.

When the first power source 61 receives the low voltage detection signal UVLO of the enable level, the first power source 61 may stop the operation of converting the input voltage Vin into the first power voltage ELVDD. Similarly, when the second power source 62 receives the low voltage detection signal UVLO of the enable level, the second power source 62 may stop the operation of converting the input voltage Vin into the second power voltage ELVSS. Similarly, when the third power source 63 receives the low voltage detection signal UVLO of the enable level, the third power source 63 may stop the operation of converting the input voltage Vin into the third power voltage AVDD.

The first power source 61 and the second power source 62 may receive the first control signal ESW. The third power source 63 may receive the second control signal ASW.

When a voltage of a second output terminal of the second power source 62 is greater than a reference short-circuit voltage, the short-circuit detection circuit 65 may stop the operation of the second power source 62. For example, when the first power source 61 terminates a soft start operation, a first soft start signal SST1 of an enable level may be provided. When the short-circuit detection circuit 65 receives the first soft start signal SST1 of the enable level, the second power voltage ELVSS and the reference short-circuit voltage may be compared. When the second power voltage ELVSS is greater than the reference short-circuit voltage, the short-circuit detection circuit 65 may provide a short-circuit detection signal SSD of a disable level. The short-circuit detection signal SSD of the disable level may refer to a fault condition in which the first power line ELVDDL and the second power line ELVSSL are shorted. The second power source 62 receiving the short-circuit detection signal SSD of the disable level may not convert the input voltage Vin into the second power voltage ELVSS.

When the second power voltage ELVSS is less than the reference short-circuit voltage, the short-circuit detection circuit 65 may provide the short-circuit detection signal SSD of an enable level. The short-circuit detection signal SSD of the enable level may refer to a normal condition in which the first power line ELVDDL and the second power line ELVSSL are not shorted. The second power source 62 receiving the short-circuit detection signal SSD of the enable level may convert the input voltage Vin into the second power voltage ELVSS.

Figure 10:
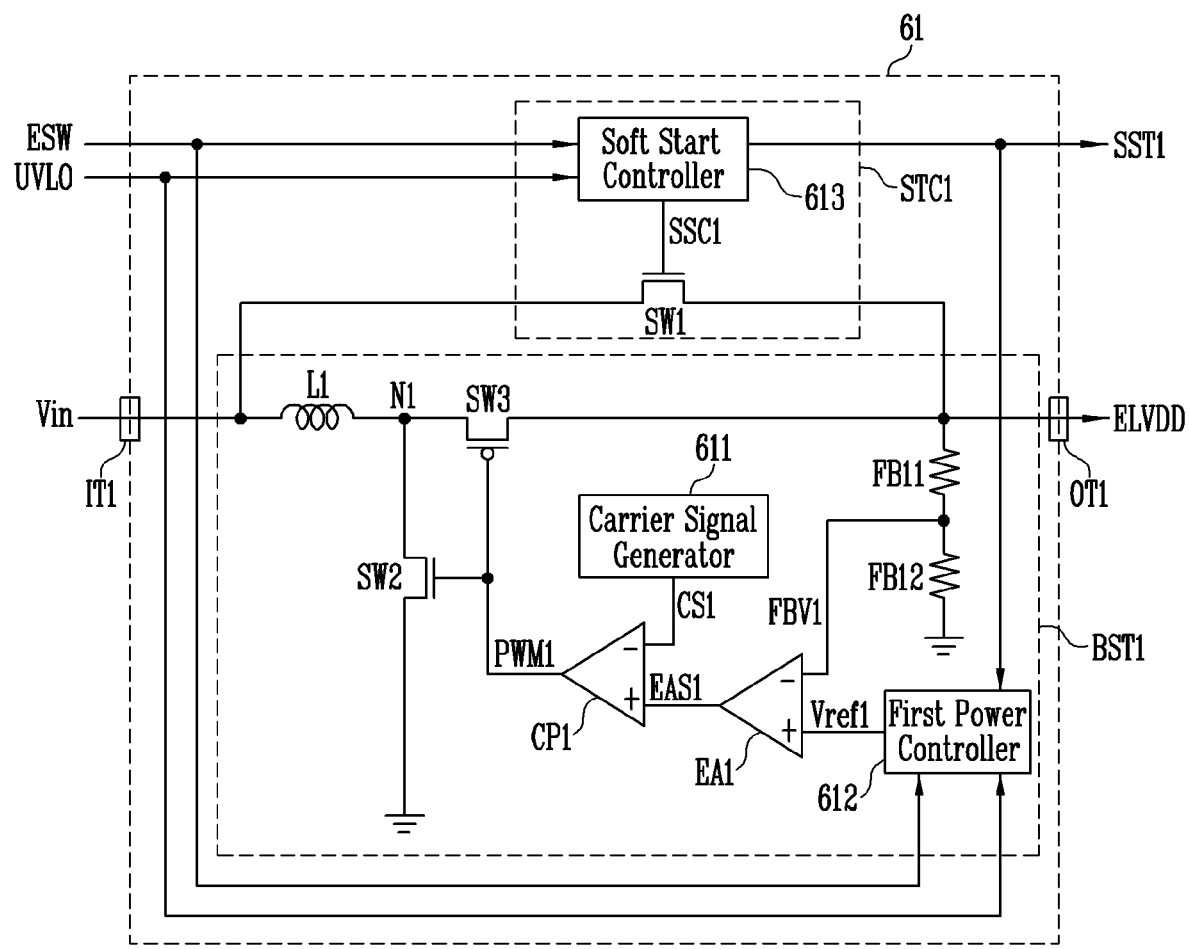
FIG. 10 is a circuit diagram for explaining a first power source according to some example embodiments of the present invention.

FIG. 10 is a circuit diagram for explaining a first power source according to some example embodiments of the present invention.

Referring to FIG. 10, the first power source 61 according to some example embodiments of the present invention may include a first soft start circuit STC1 and a first boost converter BST1.

The first power source 61 may receive the input voltage Vin from a first input terminal IT1 and provide the first power voltage ELVDD to a first output terminal OT1.

The first soft start circuit STC1 may include a soft start controller 613 and a first switch SW1. The first switch SW1 may include a first electrode connected to the first input terminal IT1 and a second electrode connected to the first output terminal OT1.

The soft start controller 613 may provide a control signal SSC1 for the first switch SW1 based on the first control signal ESW and the low voltage detection signal UVLO. For example, the soft start controller 613 may provide the control signal SSC1 of a turn-on level during the soft start operation, and the first switch SW1 may be turned on. The soft start controller 613 may provide the control signal SSC1 of a turn-off level when the soft start operation is completed, and the first switch SW1 may be turned off.

In addition, when the soft start operation is completed, the soft start controller 613 may generate the first soft start signal SST1 of the enable level. When the soft start operation is not completed, the soft start controller 613 may generate the first soft start signal SST1 of a disable level.

The first boost converter BST1 may include a first inductor L1, a second switch SW2, and a third switch SW3. In addition, the first boost converter BST1 may include a carrier signal generator 611 for controlling the second switch SW2 and the third switch SW3, a first power controller 612, a first comparator CP1, a first error amplifier EA1, and first feedback resistors FB11 and FB12.

The first inductor L1 may include one end connected to the first input terminal IT1 and the other end connected to a first node N1. The second switch SW2 may include a first electrode connected to the first node N1 and a second electrode connected to a ground power source. The third switch SW3 may include a first electrode connected to the first node N1 and a second electrode connected to the first output terminal OT1. According to some example embodiments, the third switch SW3 may be replaced with a diode having an anode connected to the first node N1 and a cathode connected to the first output terminal OT1.

The first feedback resistors FB11 and FB12 may be connected in series between the first output terminal OT1 and the ground power source. An inverting terminal of the first error amplifier EA1 may be connected between the first feedback resistors FB11 and FB12 to receive a first feedback voltage FBV1. A non-inverting terminal of the first error amplifier EA1 may receive a first reference voltage Vref1 from the first power controller 612.

The first power controller 612 may determine the first reference voltage Vref1 based on the first control signal ESW, the low voltage detection signal UVLO, and the first soft start signal SST1. The first error amplifier EA1 may increase the magnitude of a first error signal EAS1 in a positive direction as the first reference voltage Vref1 is greater than the first feedback voltage FBV1. The first error amplifier EA1 may increase the magnitude of the first error signal EAS1 in a negative direction as the first reference voltage Vref1 is less than the first feedback voltage FBV1. According to some example embodiments, the first error amplifier EA1 may provide the first error signal EAS1 having a minimum magnitude when the first reference voltage Vref1 is less than the first feedback voltage FBV1.

The carrier signal generator 611 may provide a first carrier signal CS1. The first carrier signal CS1 may be a signal in which a triangle wave is periodically repeated. The carrier signal generator 611 may employ a conventional configuration for PWM (Pulse Width Modulation) driving.

An inverting terminal of the first comparator CP1 may receive the first carrier signal CS1, and a non-inverting terminal of the first comparator CP1 may receive the first error signal EAS1. The first comparator CP1 may output a pulse when the first error signal EAS1 is greater than the first carrier signal CS1, and may not output the pulse when the first error signal EAS1 is less than the first carrier signal CS1. The output signal of the first comparator CP1 may be referred to as a first PWM signal PWM1, and a pulse width with respect to a cycle of the pulse may be referred to as a duty ratio. That is, the duty ratio may increase as the pulse width increases.

The second switch SW2 may be turned on and the third switch SW3 may be turned off in response to a pulse of the first PWM signal PWM1. That is, the longer the pulse width (ON-duty period), the longer the period during which the second switch SW2 is turned on. In this case, the current flows from the input voltage Vin to the ground power source through the first inductor L1, and energy may be stored in the first inductor L1.

On the other hand, during an OFF-duty period in which no pulse is generated, the second switch SW2 may be turned off and the third switch SW3 may be turned on. In this case, the input voltage Vin and the current flowing out of the first inductor L1 may be added, so that the first power voltage ELVDD greater than the input voltage Vin may be applied to the first output terminal OT1. As the duty ratio increases, the first power voltage ELVDD may be boosted more.

According to some example embodiments, the first soft start circuit STC1 may further include an additional switch in which a first electrode is connected to the second electrode of the third switch SW3 and a second electrode is connected to the first output terminal OT1. The first soft start circuit STC1 may operate the additional switch complementarily with the first switch SW1. For example, during the soft start operation, the first switch SW1 may be in a turn-on state and the additional switch may be in a turn-off state. In addition, when the soft start operation is completed, the first switch SW1 may be in the turn-off state and the additional switch may be in the turn-on state. When the additional switch is provided, the first boost converter BST1 may be separated from the first output terminal OT1 during the soft start operation.

Figure 11:
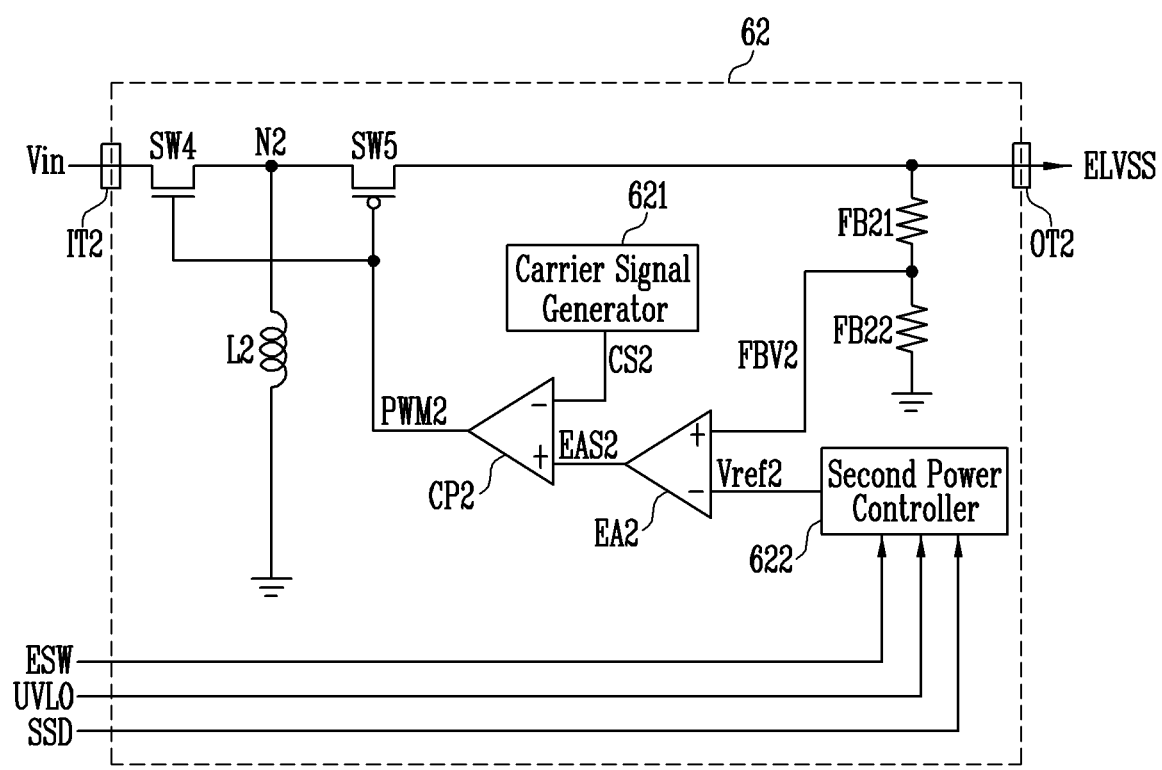
FIG. 11 is a circuit diagram for explaining a second power source according to some example embodiments of the present invention.

FIG. 11 is a circuit diagram for explaining a second power source according to some example embodiments of the present invention.

The second power source 62 may receive the input voltage Vin from a second input terminal IT2 and provide the second power voltage ELVSS to a second output terminal OT2. For example, the second power source 62 may be a buck-boost converter.

The second power source 62 may include a second inductor L2, a fourth switch SW4, and a fifth switch SW5. In addition, the second power source 62 may include a carrier signal generator 621 for controlling the fourth switch SW4 and the fifth switch SW5, a second power controller 622, a second comparator CP2, a second error amplifier EA2, and second feedback resistors FB21 and FB22.

The fourth switch SW4 may include a first electrode connected to the second input terminal IT2 and a second electrode connected to a second node N2. The second inductor L2 may include one end connected to the second node N2 and the other end connected to the ground power source. The fifth switch SW5 may include a first electrode connected to the second node N2 and a second electrode connected to the second output terminal OT2. According to some example embodiments, the fifth switch SW5 may be replaced with a diode having an anode connected to the second output terminal OT2 and a cathode connected to the second node N2.

The second feedback resistors FB21 and FB22 may be connected in series between the second output terminal OT2 and the ground power source. A non-inverting terminal of the second error amplifier EA2 may be connected between the second feedback resistors FB21 and FB22 to receive a second feedback voltage FBV2. An inverting terminal of the second error amplifier EA2 may receive a second reference voltage Vref2 from the second power controller 622.

The second power controller 622 may determine the second reference voltage Vref2 based on the first control signal ESW, the low voltage detection signal UVLO, and the short-circuit detection signal SSD. The second error amplifier EA2 may increase the magnitude of a second error signal EAS2 in the positive direction as the second reference voltage Vref2 is less than the second feedback voltage FBV2. The second error amplifier EA2 may increase the magnitude of the second error signal EAS2 in the negative direction as the second reference voltage Vref2 is greater than the second feedback voltage FBV2. According to some example embodiments, the second error amplifier EA2 may provide the second error signal EAS2 having a minimum magnitude when the second reference voltage Vref2 is greater than the second feedback voltage FBV2.

The carrier signal generator 621 may provide a second carrier signal CS2. The second carrier signal CS2 may be a signal in which a triangle wave is periodically repeated. The carrier signal generator 621 may employ the conventional configuration for the PWM driving.

An inverting terminal of the second comparator CP2 may receive the second carrier signal CS2, and a non-inverting terminal of the second comparator CP2 may receive the second error signal EAS2. The second comparator CP2 may output a pulse when the second error signal EAS2 is greater than the second carrier signal CS2, and may not output the pulse when the second error signal EAS2 is less than the second carrier signal CS2. The output signal of the second comparator CP2 may be referred to as a second PWM signal PWM2, and a pulse width with respect to a cycle of the pulse may be referred to as the duty ratio. That is, the duty ratio may increase as the pulse width increases.

The fourth switch SW4 may be turned on and the fifth switch SW5 may be turned off in response to a pulse of the second PWM signal PWM2. That is, the longer the pulse width (ON-duty period), the longer the period during which the fourth switch SW4 is turned on. In this case, the current flows from the input voltage Vin to the ground power source through the second inductor L2, and energy may be stored in the second inductor L2.

On the other hand, during the OFF-duty period in which no pulse is generated, the fourth switch SW4 may be turned off and the fifth switch SW5 may be turned on. In this case, because the second inductor L2 maintains the current flowing to the ground power source, the second power voltage ELVSS of the second output terminal OT2 becomes less than the input voltage Vin. As the duty ratio increases, the second power voltage ELVDD may be further reduced.

Figure 12:
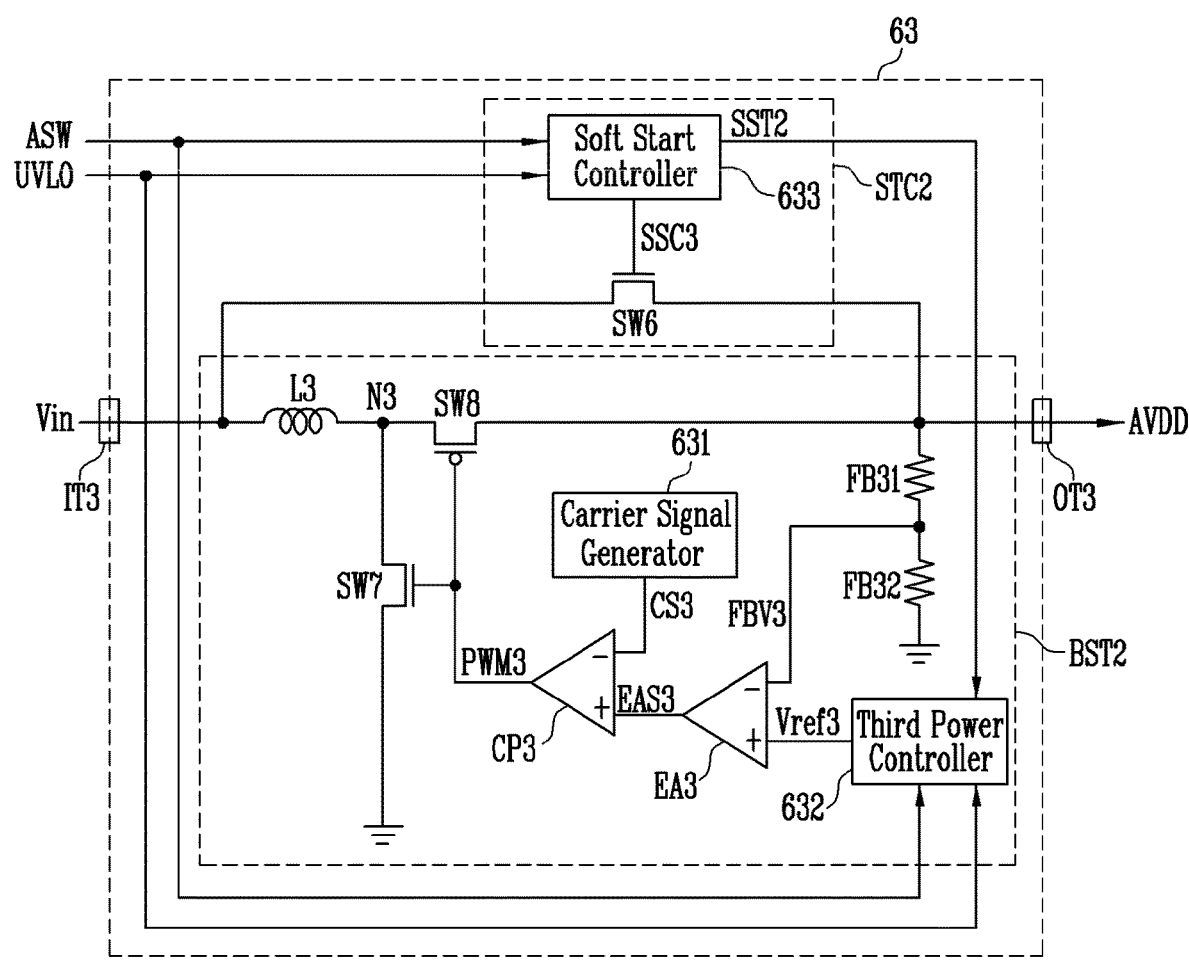
FIG. 12 is a circuit diagram for explaining a third power source according to some example embodiments of the present invention.

FIG. 12 is a circuit diagram for explaining a third power source according to some example embodiments of the present invention.

Referring to FIG. 12, the third power source 63 according to some example embodiments of the present invention may include a second soft start circuit STC2 and a second boost converter BST2.

The third power source 63 may receive the input voltage Vin from a third input terminal IT3 and provide the third power voltage AVDD to a third output terminal OT3.

The second soft start circuit STC2 may include a soft start controller 633 and a sixth switch SW6. The sixth switch SW6 may include a first electrode connected to the third input terminal IT3 and a second electrode connected to the third output terminal OT3.

The soft start controller 633 may provide a control signal SSC3 for the sixth switch SW6 based on the second control signal ASW and the low voltage detection signal UVLO. For example, the soft start controller 633 may provide the control signal SSC3 of a turn-on level during the soft start operation, and the sixth switch SW6 may be turned on. The soft start controller 633 may provide the control signal SSC3 of a turn-off level when the soft start operation is completed, and the sixth switch SW6 may be turned off.

In addition, when the soft start operation is completed, the soft start controller 633 may generate a second soft start signal SST2 of an enable level. When the soft start operation is not completed, the soft start controller 633 may generate the second soft start signal SST2 of a disable level.

The second boost converter BST2 may include a third inductor L3, a seventh switch SW7, and an eighth switch SW8. In addition, the second boost converter BST2 may include a carrier signal generator 631 for controlling the seventh switch SW7 and the eighth switch SW8, a third power controller 632, a third comparator CP3, a third error amplifier EA3, and third feedback resistors FB31 and FB32.

The third inductor L3 may include one end connected to the third input terminal IT3 and the other end connected to a third node N3. The seventh switch SW7 may include a first electrode connected to the third node N3 and a second electrode connected to the ground power source. The eighth switch SW8 may include a first electrode connected to the third node N3 and a second electrode connected to the third output terminal OT3. According to some example embodiments, the eighth switch SW8 may be replaced with a diode having an anode connected to the third node N3 and a cathode connected to the third output terminal OT3.

The third feedback resistors FB31 and FB32 may be connected in series between the third output terminal OT3 and the ground power source. An inverting terminal of the third error amplifier EA3 may be connected between the third feedback resistors FB31 and FB32 to receive a third feedback voltage FBV3. A non-inverting terminal of the third error amplifier EA3 may receive a third reference voltage Vref3 from the third power controller 632.

The third power controller 632 may determine the third reference voltage Vref3 based on the second control signal ASW, the low voltage detection signal UVLO, and the second soft start signal SST2. The third error amplifier EA3 may increase the magnitude of a third error signal EAS3 in the positive direction as the third reference voltage Vref3 is greater than the third feedback voltage FBV3. The third error amplifier EA3 may increase the magnitude of the third error signal EAS3 in the negative direction as the third reference voltage Vref3 is less than the third feedback voltage FBV3. According to some example embodiments, the third error amplifier EA3 may provide the third error signal EAS3 having a minimum magnitude when the third reference voltage Vref3 is less than the third feedback voltage FBV3.

The carrier signal generator 631 may provide a third carrier signal CS3. The third carrier signal CS3 may be a signal in which a triangle wave is periodically repeated. The carrier signal generator 631 may employ the conventional configuration for the PWM driving.

An inverting terminal of the third comparator CP3 may receive the third carrier signal CS3, and a non-inverting terminal of the third comparator CP3 may receive the third error signal EAS3. The third comparator CP3 may output a pulse when the third error signal EAS3 is greater than the third carrier signal CS3, and may not output the pulse when the third error signal EAS3 is less than the third carrier signal CS3. The output signal of the third comparator CP3 may be referred to as a third PWM signal PWM3, and a pulse width with respect to a cycle of the pulse may be referred to as the duty ratio. That is, the duty ratio may increase as the pulse width increases.

The seventh switch SW7 may be turned on and the eighth switch SW8 may be turned off in response to a pulse of the third PWM signal PWM3. That is, the longer the pulse width (ON-duty period), the longer the period during which the seventh switch SW7 is turned on. In this case, the current flows from the input voltage Vin to the ground power source through the third inductor L3, and energy may be stored in the third inductor L3.

On the other hand, during the OFF-duty period in which no pulse is generated, the seventh switch SW7 may be turned off and the eighth switch SW8 may be turned on. In this case, the input voltage Vin and the current flowing out of the third inductor L3 may be added, so that the third power voltage AVDD greater than the input voltage Vin may be applied to the third output terminal OT3. As the duty ratio increases, the third power voltage AVDD may be boosted more.

According to some example embodiments, the second soft start circuit STC2 may further include an additional switch in which a first electrode is connected to the second electrode of the eighth switch SW8 and a second electrode is connected to the third output terminal OT3. The second soft start circuit STC2 may operate the additional switch complementarily with the sixth switch SW6. For example, during the soft start operation, the sixth switch SW6 may be in a turn-on state and the additional switch may be in a turn-off state. In addition, when the soft start operation is completed, the sixth switch SW6 may be in the turn-off state and the additional switch may be in the turn-on state. When the additional switch is provided, the second boost converter BST2 may be separated from the third output terminal OT3 during the soft start operation.

Figure 13:
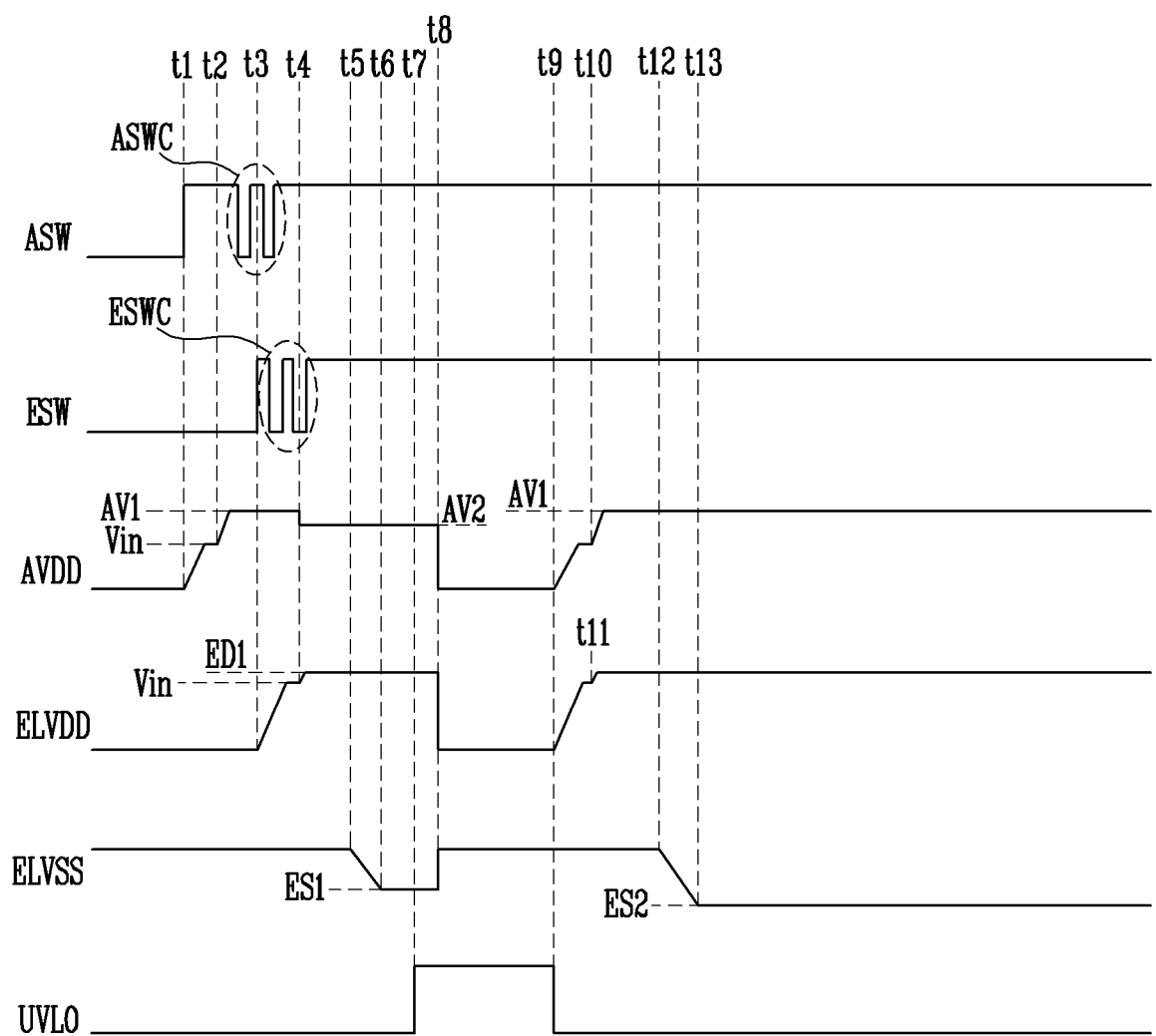
FIG. 13 is a timing diagram for explaining a driving method of a power provider according to some example embodiments of the present invention.

FIG. 13 is a timing diagram for explaining a driving method of a power provider according to some example embodiments of the present invention.

Before a time point t1, the display device 9 may be in a power-off state. At this time, the first control signal ESW and the second control signal ASW may be disabled levels (logic low levels).

At the time point t1, the display device 9 may be powered-on. At this time, the second control signal ASW may be changed from the disable level to an enable level (a logic high level). In this case, the second soft start circuit STC2 may connect the third input terminal IT3 to the third output terminal OT3 during a fifth period t1 to t2. That is, the sixth switch SW6 may be turned on during the fifth period t1 to t2. Therefore, the third output terminal OT3 may be charged with the input voltage Vin. At a time point t2 when the soft start operation is completed, the sixth switch SW6 may be turned off.

After the fifth period t1 to t2, the second boost converter BST2 may convert the input voltage Vin to provide the third power voltage AVDD greater than the input voltage Vin to the third output terminal OT3. At this time, the third power voltage AVDD may be boosted to a default level (e.g., a set or predetermined default level) AV1.

After the third power voltage AVDD is boosted to the default level AV1, the second control signal ASW may be level controlled ASWC. The level control ASWC of the second control signal ASW may be a method changing a level of the second control signal ASW multiple times at intervals (e.g., set or predetermined intervals) in order to transmit information on a voltage level at which the third power voltage AVDD is to be reached to the third power controller 632.

Therefore, at a time point t4, the third power voltage AVDD may be converted to a use level AV2 under the control of the third power controller 632.

At a time point t3, the first control signal ESW may be changed from the disable level to the enable level. In this case, the first soft start circuit STC1 may connect the first input terminal IT1 to the first output terminal OT1 during a first period t3 to t4. That is, the first switch SW1 may be turned on during the first period t3 to t4. Therefore, the first output terminal OT1 may be charged with the input voltage Vin. At the time point t4 when the soft start operation is completed, the first switch SW1 may be turned off.

After the first period t3 to t4, the first boost converter BST1 may convert the input voltage Vin to provide the first power voltage ELVDD greater than the input voltage Vin to the first output terminal OT1. During the first period t3 to t4, the first control signal ESW may be level controlled ESWC. In this case, it is assumed that the level control ESWC of the first control signal ESW is for the second power voltage ELVSS. Accordingly, the first power voltage ELVDD irrelevant to the level control ESWC may be boosted to a default level (e.g., a set or predetermined default level) ED1.

At the time point t4, the short-circuit detection circuit 65 may receive the first soft start signal SST1 of the enable level from the soft start controller 613. During a fourth period t4 to t5, the short-circuit detection circuit 65 may detect whether the second output terminal OT2 is shorted. During the fourth period t4 to t5, the short-circuit detection circuit 65 may stop the operation of the second power source 62 when a voltage of the second output terminal OT2 is greater than the reference short-circuit voltage. Hereinafter, a normal condition in which the second power line ELVSSL is not short-circuited is assumed. Accordingly, at a time point t5, the second power controller 622 may receive the short-circuit detection signal SSD of the enable level output from the short-circuit detection circuit 65.

During a third period t5 to t6, the second power source 62 may convert the input voltage Vin received by the second input terminal IT2 to provide the second power voltage ELVSS less than the input voltage Vin to the second output terminal OT2. The second power controller 622 may drop the second power voltage ELVSS to a use level ES1 based on the level control ESWC of the first control signal ESW previously received.

Accordingly, a time point t6 may be a time point when the first power voltage ELVDD, the second power voltage ELVSS, and the third power voltage AVDD are completely converted to a target level. The display device 9 may display the image using the pixels from the time point t6. The first power voltage ELVDD may be greater than the second power voltage ELVSS. Also, the third power voltage AVDD may be greater than the first power voltage ELVDD.

It is assumed that the low voltage detection signal UVLO is changed from the disable level (logic low level) to the enable level (logic high level) at a time point t7. That is, at the time point t7, a temporary fault condition in which the input voltage Vin is less than the reference low voltage is assumed. Therefore, at a time point t8, the first boost converter BST1, the second power source 62, and the second boost converter BST2 may stop the operation of converting of the input voltage Vin. Accordingly, at the time point t8, the first power voltage ELVDD, the second power voltage ELVSS, and the third power voltage AVDD may be ground voltage levels.

It is assumed that the low voltage detection signal UVLO is changed from the enable level to the disable level at a time point t9. That is, at the time point t9, a restored normal condition in which the input voltage Vin is greater than the reference low voltage is assumed.

In this case, the first soft start circuit STC1 may connect the first input terminal IT1 to the first output terminal OT1 during a second period t9 to t11. After the second period t9 to t11, the first boost converter BST1 may convert the input voltage Vin to provide the first power voltage ELVDD greater than the input voltage Vin to the first output terminal OT1.

Similarly, the second soft start circuit STC2 may connect the third input terminal IT3 to the third output terminal OT3 during a sixth period t9 to t10. After the sixth period t9 to t11, the second boost converter BST2 may convert the input voltage Vin to provide the third power voltage AVDD greater than the input voltage Vin to the third output terminal OT3. In this case, because the level control ASWC of the second control signal ASW has not been provided after the time point t8, the third power voltage AVDD may be boosted to the default level AV1.

During a period t11 to t12, the short-circuit detection circuit 65 may detect whether the second output terminal OT2 is shorted. Because the operation of the short-circuit detection circuit 65 during the period t11 to t12 is the same as the operation during the fourth period t4 to t5, duplicate description is omitted.

During a period t12 to t13, the second power source 62 may convert the input voltage Vin received by the second input terminal IT2 to provide the second power voltage ELVSS less than the input voltage Vin to the second output terminal OT2. In this case, because the level control ESWC of the first control signal ESW has not been provided after the time point t8, the second power voltage ELVSS may drop to a default level ES2.

If the first boost converter BST1 directly boosts the first power voltage ELVDD from the ground voltage level to the default level ED1 without the help of the first soft start circuit STC1, a very large inrush current may be generated in the battery providing the input voltage Vin. The same problem may also occur in the third power source 63. According to some example embodiments, even when the low voltage detection signal UVLO is changed from the enable level to the disable level, because the soft start circuits STC1 and STC2 are operated, the inrush current may be reduced in the battery providing the input voltage Vin.

Figure 14:
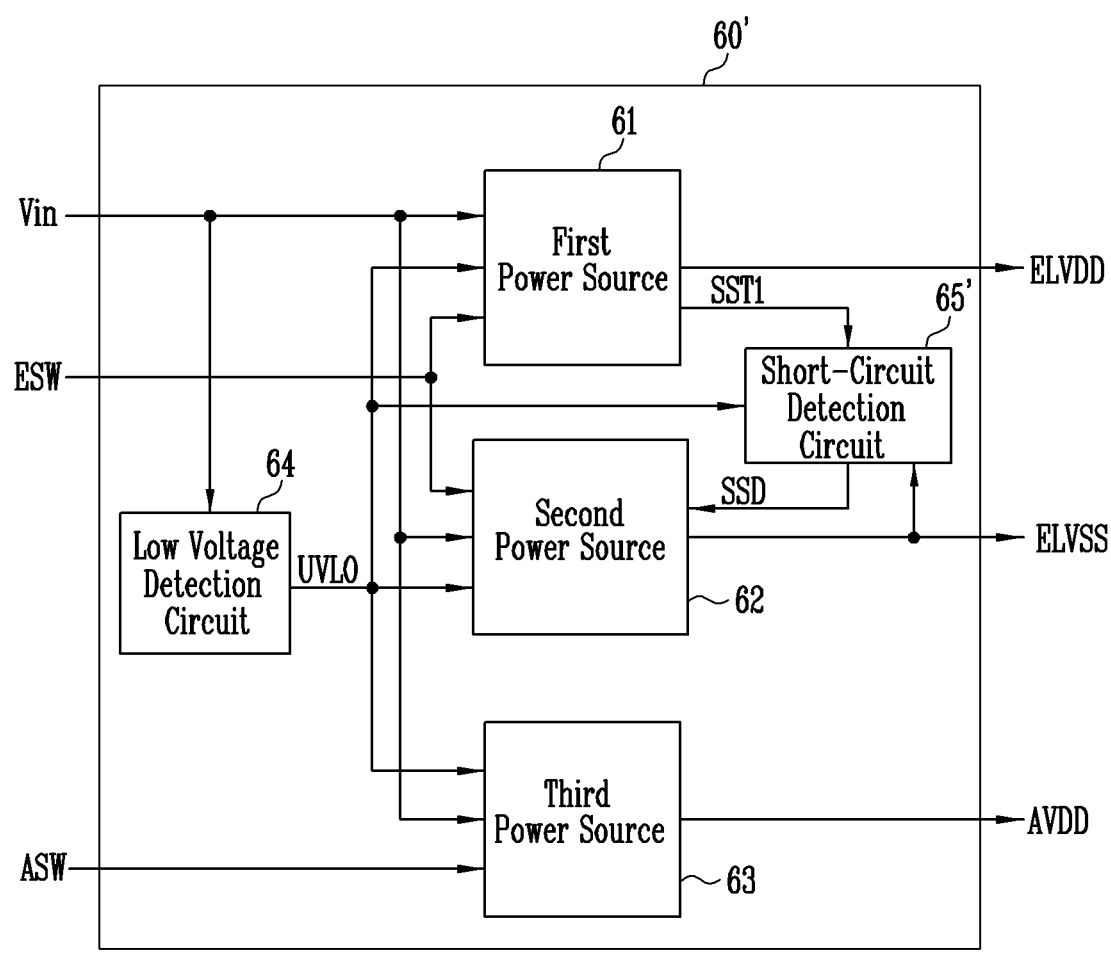
FIG. 14 is a block diagram for explaining a power provider according to some example embodiments of the present invention.
Figure 15:
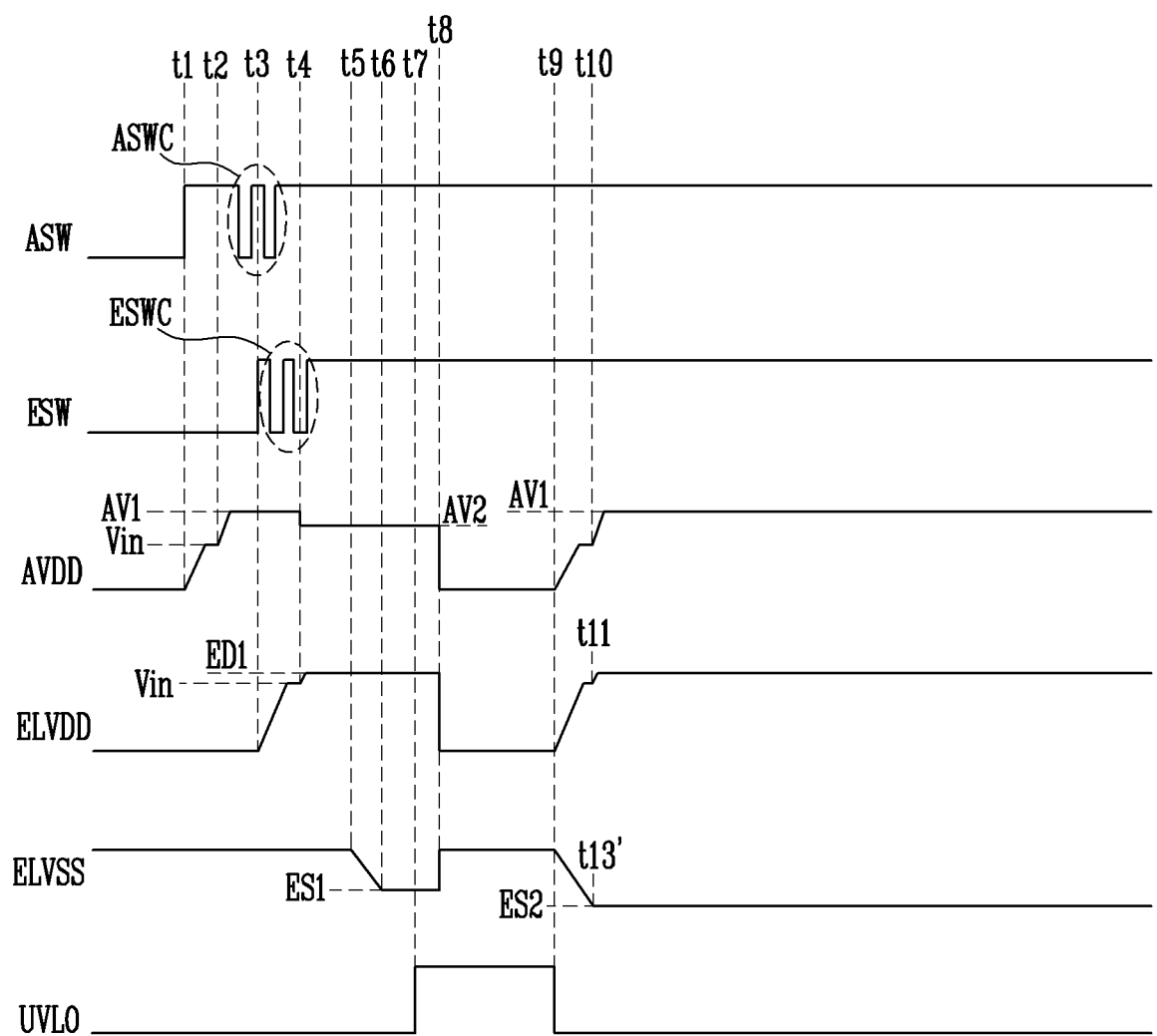
FIG. 15 is a timing diagram for explaining a driving method of the power provider of FIG. 14.

FIG. 14 is a block diagram for explaining a power provider according to some example embodiments of the present invention. FIG. 15 is a timing diagram for explaining a driving method of the power provider of FIG. 14.

A power provider 60' of FIG. 14 is different from the power provider 60 of FIG. 9 in that a short-circuit detection circuit 65' receives the low voltage detection signal UVLO.

According to some example embodiments, the short-circuit detection circuit 65' may output the short-circuit detection signal SSD of the enable level when the low voltage detection signal UVLO is changed from the enable level to the disabled level. That is, the short-circuit detection circuit 65' may output the short-circuit detection signal SSD of the enable level at the time point t9 without a separate short-circuit detection process.

Accordingly, the second power source 62 may convert the input voltage Vin to provide the second power voltage ELVSS less than the input voltage Vin to the second output terminal OT2 during at least a portion t9 to t13' of the second period t9 to t11.

According to some example embodiments, when the low voltage detection signal UVLO is changed from the enable level to the disable level, an unnecessary short-circuit detection process may be omitted. Because the short-circuited is a physical state, the short-circuit inspection during the fourth period t4 to t5 after the display device 9 is powered on may be sufficient. According to some example embodiments, the short-circuit detection process is omitted, so that the pixels can start displaying the image as fast as 10 ms.

Figure 16:
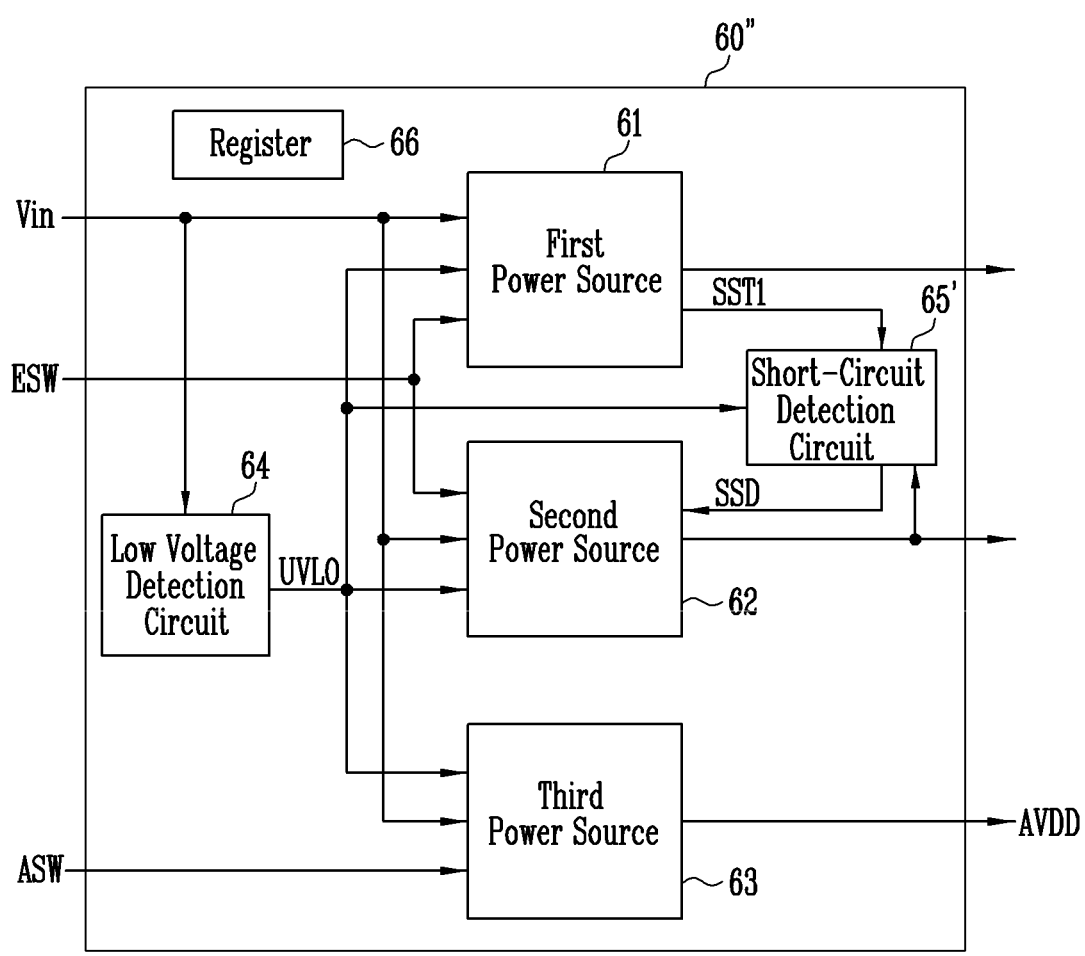
FIG. 16 is a block diagram for explaining a power provider according to some example embodiments of the present invention.
Figure 17:
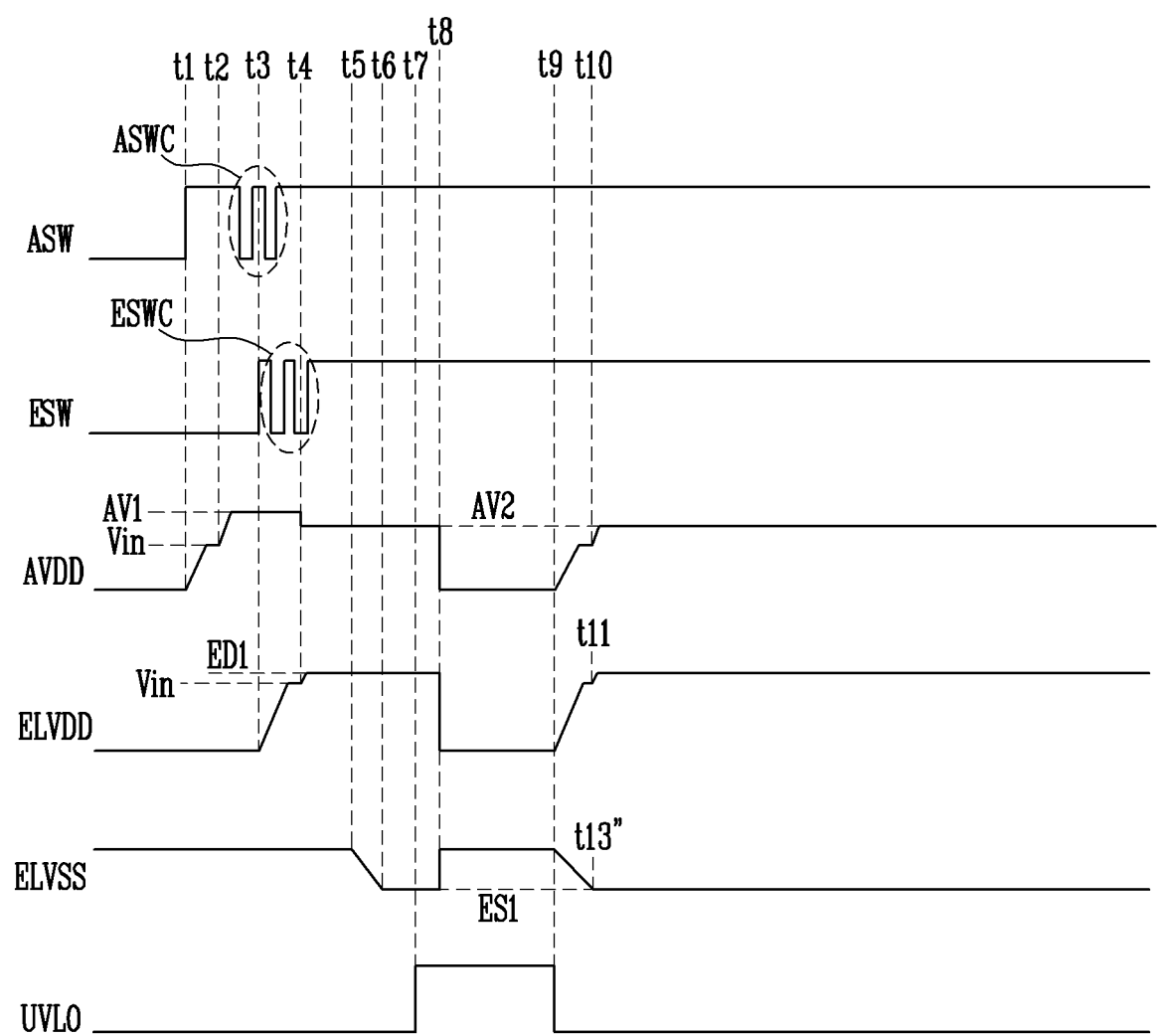
FIG. 17 is a timing diagram for explaining a driving method of the power provider of FIG. 16.

FIG. 16 is a block diagram for explaining a power provider according to some example embodiments of the present invention. FIG. 17 is a timing diagram for explaining a driving method of the power provider of FIG. 16.

A power provider 60'' of FIG. 16 is different from the power provider 60' of FIG. 14 in that the power provider 60'' further includes a register 66.

The register 66 may include information on a voltage level of the second power voltage ELVSS. For example, the register 66 may store the information on the voltage level of the second power voltage ELVSS according to the level control ESWC of the first control signal ESW. The register 66 may maintain the information on the voltage level of the second power voltage ELVSS despite the level change of the low voltage detection signal UVLO during a period t8 to t9.

When the low voltage detection signal UVLO is changed from the enable level to the disable level, the second power source 62 may determine the voltage level of the second power voltage ELVSS referring to the information provided by the register 66. Therefore, the second power voltage ELVSS may reach the use level ES1 at a time point t13" when the conversion is completed.

According to some example embodiments, the register 66 may include information on voltage levels of the first power voltage ELVDD or the third power voltage AVDD. Similarly, when the low voltage detection signal UVLO is changed from the enable level to the disable level, the third power source 63 may determine a voltage level of the third power voltage AVDD referring to the information provided by the register 66. Therefore, the third power voltage AVDD may reach the use level AV2 at the time point when the conversion is completed.

According to some example embodiments, when the low voltage detection signal UVLO is changed from the enable level to the disable level, the second power voltage ELVSS may directly reach the use level ES1 without going through the default level ES2. Therefore, display quality (luminance, etc.) by the pixels can be maintained before and after the level change of the low voltage detection signal UVLO.

In addition, according to some example embodiments, when the low voltage detection signal UVLO is changed from the enable level to the disable level, the third power voltage AVDD may directly reach the use level AV2 without going through the default level AV1. Therefore, increases in current consumption can be prevented or mitigated, and a logic malfunction of the data driver 20 can be prevented or mitigated before and after the level change of the low voltage detection signal UVLO.

The power provider and the driving method thereof according to the present invention can be efficiently operated when power-on or an UVLO operation is released.

The drawings referred to heretofore and the detailed description of the invention described above are merely illustrative of the invention. It is to be understood that the invention has been disclosed for illustrative purposes only and is not intended to limit the scope of the invention. Therefore, those skilled in the art will appreciate that various modifications and equivalent embodiments are possible without departing from the scope of the invention. Accordingly, the true scope of the invention should be determined by the technical idea of the appended claims, and their equivalents.

What is claimed is:

1. A power provider comprising:
   a first power source configured to receive an input voltage from a first input terminal and to provide a first power voltage to a first output terminal; and
   a low voltage detection circuit configured to provide a low voltage detection signal of an enable level in response to the input voltage being less than a reference low voltage, and to provide the low voltage detection signal of a disable level in response to the input voltage being greater than the reference low voltage,
   wherein the first power source includes:
   a first soft start circuit configured to connect the first input terminal to the first output terminal during a first period in response to a first control signal for the first power source being changed from a disable level to an enable level; and
   a first boost converter configured to convert the input voltage to provide the first power voltage greater than the input voltage to the first output terminal after the first period,
   wherein the first boost converter is configured to stop the conversion of the input voltage in response to the low voltage detection signal being changed from the disable level to the enable level, and
   wherein the first soft start circuit is configured to connect the first input terminal to the first output terminal during a second period in response to the low voltage detection signal being changed from the enable level to the disable level.

2. The power provider of claim 1, wherein the first boost converter is configured to convert the input voltage to provide the first power voltage greater than the input voltage to the first output terminal after the second period.

3. The power provider of claim 2, further comprising:
   a second power source configured to convert the input voltage received by a second input terminal to provide a second power voltage less than the input voltage to a second output terminal during a third period between the first period and the second period; and
   a short-circuit detection circuit configured to stop an operation of the second power source in response to a voltage of the second output terminal being greater than a reference short-circuit voltage during a fourth period between the first period and the third period.

4. The power provider of claim 3, wherein the second power source is configured to convert the input voltage to provide the second power voltage less than the input voltage to the second output terminal during at least a portion of the second period.

5. The power provider of claim 3, further comprising:
   a register including information on a voltage level of the second power voltage,
   wherein the second power source is configured to determine the voltage level of the second power voltage referring to the information provided from the register in response to the low voltage detection signal being changed from the enable level to the disable level.

6. The power provider of claim 3, wherein the first soft start circuit includes a first switch having a first electrode connected to the first input terminal and a second electrode connected to the first output terminal.

7. The power provider of claim 6, wherein the first boost converter includes:
   a first inductor having one end connected to the first input terminal and the other end connected to a first node;
   a second switch having a first electrode connected to the first node and a second electrode connected to a ground power source; and
   a third switch having a first electrode connected to the first node and a second electrode connected to the first output terminal.

8. The power provider of claim 7, wherein the second power source includes:
   a fourth switch having a first electrode connected to the second input terminal and a second electrode connected to a second node;

a second inductor having one end connected to the second node and the other end connected to the ground power source; and a fifth switch having a first electrode connected to the second node and a second electrode connected to the second output terminal.

9. The power provider of claim 8, further comprising:

a third power source configured to receive the input voltage from a third input terminal and to provide a third power voltage to a third output terminal, wherein the third power source includes:

a second soft start circuit configured to connect the third input terminal to the third output terminal during a fifth period in response to a second control signal for the third power source being changed from a disable level to an enable level; and a second boost converter configured to convert the input voltage to provide the third power voltage greater than the input voltage to the third output terminal after the fifth period, and wherein the third power voltage is greater than the first power voltage during the third period.

10. The power provider of claim 9, wherein the second boost converter is configured to stop the conversion of the input voltage in response to the low voltage detection signal being changed from the disable level to the enable level, and wherein the second soft start circuit is configured to connect the third input terminal to the third output terminal during a sixth period in response to the low voltage detection signal being changed from the enable level to the disable level.

11. The power provider of claim 10, wherein the second soft start circuit includes a sixth switch having a first electrode connected to the third input terminal and a second electrode connected to the third output terminal.

12. The power provider of claim 11, wherein the second boost converter includes:

a third inductor having one end connected to the third input terminal and the other end connected to a third node;

a seventh switch having a first electrode connected to the third node and a second electrode connected to the ground power source; and an eighth switch having a first electrode connected to the third node and a second electrode connected to the third output terminal.

13. A power provider comprising:

a first power source configured to convert an input voltage received from a first input terminal to provide a first power voltage greater than the input voltage to a first output terminal;

a second power source configured to convert the input voltage received from a second input terminal to provide a second power voltage less than the input voltage to a second output terminal; and a low voltage detection circuit configured to provide a low voltage detection signal of an enable level in response to the input voltage being less than a reference low voltage, and to provide the low voltage detection signal of a disable level in response to the input voltage being greater than the reference low voltage, wherein the first power source and the second power source are configured to stop the conversion of the input voltage in response to the low voltage detection signal being changed from the disable level to the enable level, wherein the first power source is configured to increase a level of the first power voltage during a first period in response to the low voltage detection signal being changed from the enable level to the disable level, and wherein the second power source is configured to decrease a level of the second power voltage during at least a portion of the first period.

14. The power provider of claim 13, further comprising:

a register including information on a voltage level of the second power voltage, wherein the second power source is configured to determine the voltage level of the second power voltage referring to the information provided from the register in response to the low voltage detection signal being changed from the enable level to the disable level.

15. The power provider of claim 14, further comprising:

a third power source configured to convert the input voltage received from a third input terminal to provide a third power voltage greater than the input voltage to a third output terminal, wherein the third power source is configured to stop the conversion of the input voltage in response to the low voltage detection signal being changed from the disable level to the enable level, wherein the third power source is configured to increase a level of the third power voltage during a second period in response to the low voltage detection signal being changed from the enable level to the disable level, and wherein the level of the third power voltage after the first period and the second period has elapsed is greater than the level of the first power voltage.

16. A driving method of a power provider, wherein the power provider includes:

a first power source configured to receive an input voltage from a first input terminal and to provide a first power voltage to a first output terminal; and a low voltage detection circuit configured to provide a low voltage detection signal of an enable level in response to the input voltage being less than a reference low voltage, and to provide the low voltage detection signal of a disable level in response to the input voltage being greater than the reference low voltage, and wherein the driving method includes:

connecting the first input terminal to the first output terminal during a first period in response to a first control signal for the first power source being changed from a disable level to an enable level;

converting the input voltage to provide the first power voltage greater than the input voltage to the first output terminal after the first period;

stopping the conversion of the input voltage by the first power source in response to the low voltage detection signal being changed from the disable level to the enable level; and connecting the first input terminal to the first output terminal during a second period in response to the low voltage detection signal being changed from the enable level to the disable level.

17. The driving method of claim 16, wherein the driving method further includes:

converting the input voltage by the first power source to provide the first power voltage greater than the input voltage to the first output terminal after the second period.

18. The driving method of claim 17, wherein the power provider further includes a second power source configured to receive the input voltage from a second input terminal and to provide a second power voltage to a second output terminal, and wherein the driving method further includes:

converting the input voltage received from the second input terminal by the second power source to provide the second power voltage less than the input voltage to the second output terminal during a third period between the first period and the second period; and stopping an operation of the second power source in response to a voltage of the second output terminal being greater than a reference short-circuit voltage during a fourth period between the first period and the third period.

19. The driving method of claim 18, wherein the driving method further includes:

converting the input voltage by the second power source to provide the second power voltage less than the input voltage to the second output terminal during at least a portion of the second period.

20. The driving method of claim 19, wherein the power provider further includes a register including information on a voltage level of the second power voltage, and wherein the driving method further includes:

determining the voltage level of the second power voltage by the second power source referring to the information provided from the register in response to the low voltage detection signal being changed from the enable level to the disable level.

* * * * *